US008846781B2

(12) United States Patent
Morgenstern et al.

(10) Patent No.: US 8,846,781 B2
(45) Date of Patent: Sep. 30, 2014

(54) USE OF OILS WITH HIGH CONCENTRATIONS OF POLYUNSATURATED FATTY ACIDS IN PLASTICS AND SURFACE COATINGS

(75) Inventors: David A. Morgenstern, Creve Coeur, MO (US); Vallabh Makadia, St. Louis, MO (US); Jerald Heise, St. Louis, MO (US); Beth J. Calabotta, St. Louis, MO (US); Joann Estep, St. Louis, MO (US); Nicholas J. Nissing, St. Charles, MO (US)

(73) Assignee: Monsanto Technology LLC, St. Louis, MI (US)

(*) Notice: Subject to any disclaimer, the term of this patent is extended or adjusted under 35 U.S.C. 154(b) by 949 days.

(21) Appl. No.: 12/238,137

(22) Filed: Sep. 25, 2008

(65) Prior Publication Data

US 2009/0081465 A1 Mar. 26, 2009

Related U.S. Application Data

(60) Provisional application No. 60/975,032, filed on Sep. 25, 2007.

(51) Int. Cl.
| | | |
|---|---|---|
| *B05D 3/02* | (2006.01) | |
| *B32B 9/04* | (2006.01) | |
| *B32B 27/00* | (2006.01) | |
| *B32B 27/32* | (2006.01) | |
| *B41F 31/00* | (2006.01) | |
| *C04B 9/02* | (2006.01) | |
| *C08G 18/42* | (2006.01) | |
| *C08K 11/00* | (2006.01) | |
| *C08L 9/00* | (2006.01) | |
| *C08L 51/00* | (2006.01) | |
| *C08L 67/00* | (2006.01) | |
| *C08L 91/00* | (2006.01) | |
| *C08L 99/00* | (2006.01) | |
| *C09D 4/00* | (2006.01) | |
| *C09D 5/00* | (2006.01) | |
| *C09D 11/00* | (2014.01) | |
| *C09D 101/00* | (2006.01) | |
| *C09D 201/00* | (2006.01) | |
| *C09D 11/38* | (2014.01) | |
| *C09D 11/06* | (2006.01) | |
| *C09D 11/101* | (2014.01) | |

(52) U.S. Cl.
CPC ............... *C09D 11/00* (2013.01); *C09D 11/38* (2013.01); *C09D 11/06* (2013.01); *C09D 11/101* (2013.01)
USPC ..................... 523/160; 106/14.22; 106/14.23; 106/14.24; 106/31.13; 106/31.34; 106/31.35; 106/31.66; 106/31.67; 106/243; 106/244; 106/250; 106/251; 427/372.2; 427/385.5; 428/411.1; 428/497; 428/500; 428/521; 523/161; 524/78; 524/539; 527/600; 101/491

(58) Field of Classification Search
USPC ............. 523/160, 161; 524/78, 539; 527/600; 106/14.22, 14.23, 14.24, 31.13, 31.35, 106/31.66, 31.67, 243, 244, 250, 251, 106/31.34; 428/411.1, 497, 500, 521; 427/372.2, 385.5; 101/491
See application file for complete search history.

(56) References Cited

U.S. PATENT DOCUMENTS

| | | | |
|---|---|---|---|
| 2,381,653 A * | 8/1945 | Drummond | ............... 106/264 |
| 3,282,936 A | 11/1966 | Tscharner | |
| 4,242,244 A | 12/1980 | Malatesta | |
| 4,253,397 A | 3/1981 | Emmons et al. | |
| 4,255,196 A | 3/1981 | Emmons et al. | |
| 4,636,543 A | 1/1987 | Helton | |
| 4,886,893 A | 12/1989 | Meffert et al. | |
| 5,122,188 A | 6/1992 | Erhan et al. | |
| 5,158,992 A | 10/1992 | Caselli et al. | |
| 5,178,672 A | 1/1993 | Miller | |
| 5,324,846 A | 6/1994 | Hirshman et al. | |
| 5,552,467 A | 9/1996 | Reiter et al. | |
| 6,176,914 B1 | 1/2001 | Feustel et al. | |
| 6,200,372 B1 | 3/2001 | Krishnan et al. | |
| 6,646,025 B1 | 11/2003 | Kingman et al. | |
| 6,686,056 B2 | 2/2004 | Roos et al. | |
| 6,730,153 B2 | 5/2004 | Tsuchiya et al. | |
| 6,794,055 B2 | 9/2004 | DeSaw et al. | |
| 6,797,753 B2 | 9/2004 | Benecke et al. | |
| 6,835,327 B2 | 12/2004 | Behling | |
| 2003/0187103 A1* | 10/2003 | Bloom et al. | ................ 524/35 |

(Continued)

FOREIGN PATENT DOCUMENTS

| | | |
|---|---|---|
| EP | 0 731 150 A1 | 9/1996 |
| EP | 1 160 259 A1 | 12/2001 |

(Continued)

OTHER PUBLICATIONS

Canty, W. H., et al., "Drier Catalyst Activity of 1,10-Phenanthroline in Organic Coatings," Industrial & Engineering Chemistry, Jan. 1960, pp. 67-70, vol. 52, No. 1.

(Continued)

*Primary Examiner* — Patrick Niland
(74) *Attorney, Agent, or Firm* — Senniger Powers LLP; Byron V. Olsen

(57) ABSTRACT

Oil compositions having a high concentration of polyunsaturated fatty acids are described for use in various applications including use as drying oils, in ink compositions and coating compositions. Oil compositions wherein the double bonds of the fatty acids are substantially epoxidized are described and used as plasticizers and thermal stabilizers for various halogenated polymer compositions.

25 Claims, No Drawings

(56) References Cited

U.S. PATENT DOCUMENTS

| | | |
|---|---|---|
| 2006/0079607 A1 | 4/2006 | Balmer et al. |
| 2007/0263060 A1 | 11/2007 | Laksin et al. |
| 2007/0275258 A1 | 11/2007 | Ohnishi et al. |
| 2007/0289488 A1 | 12/2007 | McIntosh et al. |

FOREIGN PATENT DOCUMENTS

| | | |
|---|---|---|
| WO | 2006/042038 A1 | 4/2006 |
| WO | 2006/052662 A2 | 5/2006 |
| WO | 2006/052664 A2 | 5/2006 |
| WO | 2006/052974 A1 | 5/2006 |
| WO | 2007/051302 A1 | 5/2007 |
| WO | 2007/074333 A2 | 7/2007 |
| WO | 2007/074334 A2 | 7/2007 |

OTHER PUBLICATIONS

Chadwick, A. F., et al., "Theory and Practice of Resin-Catalyzed Epoxidation," The Journal of the American Oil Chemists' Society, Jul. 1958, pp. 355-358, vol. 35.

Erhan, S. Z., et al., "Comparisons of Volatile Organic Chemical Content of News, Sheetfed, and Heatset Ink Formulations," The Journal of the American Oil Chemists' Society, 2001, pp. 419-422, vol. 78, No. 4.

Erhan, S. Z., et al., "Lithographic and Letterpress Ink Vehicles from Vegetable Oils," The Journal of the American Oil Chemists' Society, Sep. 1991, pp. 635-638, vol. 68, No. 9.

Erhan, S. Z., et al., "Polymerization of Vegetable Oils and Their Uses in Printing Inks," The Journal of the American Oil Chemists' Society, Nov. 1994, pp. 1223-1226, vol. 71, No. 11.

Erhan, S. Z., et al., "Vegetable-Oil-Based Printing Ink Formulation and Degradation," Industrial Crops and Products, An International Journal, 1995, pp. 237-246, vol. 3.

Erhan, S. Z., et al., "Vegetable Oil-Based Printing Inks," The Journal of the American Oil Chemists' Society, Mar. 1992, pp. 251-256, vol. 69, No. 3.

Fath, J., "Significance of Oxirane and Iodine Values in Epoxy Plasticizers," Modern Plastics, Apr. 1960, pp. 135-144, 147, 203, vol. 8.

Noirot, P.-A., "Green Ink for All Colors," Ink Maker, Apr. 2004, pp. 29-31.

Wegner, E.-E., "131. Soybean Oil in Printing Inks," Oils-Fats-Lipids 1995, Proceedings of the World Congress of the International Society for Fat Research, 21st, The Hague, Oct. 1-6, 1995 (1996), pp. 515-517, vol. 3.

\* cited by examiner

USE OF OILS WITH HIGH CONCENTRATIONS OF POLYUNSATURATED FATTY ACIDS IN PLASTICS AND SURFACE COATINGS

CROSS-REFERENCE TO RELATED APPLICATIONS

This application is a non-provisional patent application of U.S. Provisional Patent Application Ser. No. 60/975,032, entitled HIGH PUFA OILS AND USES THEREOF, filed on Sep. 25, 2007, which is incorporated herein by reference.

FIELD OF THE INVENTION

The present invention is directed to oil compositions useful as drying oils and in ink and other coating compositions and epoxidized oil compositions useful as plasticizers and thermal stabilizers for halogenated polymers.

BACKGROUND

Among the most important physical characteristics of plasticized polyvinyl chloride (PVC) are flexibility and pliability. These physical characteristics are achieved by compounding PVC resin with one or more materials which serve as plasticizers following their addition to the PVC resin. Plasticizers are high boiling point liquids that do not evaporate from the matrices they are added to, but rather preserve the flexibility of plastic sheeting and film. The majority of PVC plasticizers currently utilized in industrial processes are petroleum-derived phthalates and benzoate compounds. Dioctyl phthalate (DOP) and diallyl phthalate (DAP) are examples of petroleum-derived compounds commonly used as primary plasticizers for PVC.

While effective as primary plasticizers, petroleum-derived plasticizers are subject to several significant limitations. In addition to being derived from a nonrenewable source, petroleum-derived PVC plasticizers are often expensive to produce due to fluctuations in the price and availability of crude oil. Furthermore, petroleum-derived plasticizers such as DOP are suspected to disrupt human endocrine activity (see Modern Plastics, January 1998, p 35).

Epoxidized soybean oil (ESO) can be added to a PVC formulation as a stabilizer. ESO is generally recognized as safe and is therefore of particular value in plastics formulations intended for medical and food applications as well as toys. Epoxidized linseed oil is also used commercially, although less commonly due to its higher cost. Although some epoxidized vegetable oils are commercially available as plasticizers, ESO has limited compatibility with PVC at levels above 10 parts per hundred resin (phr).

Drying oils are organic liquids which, when applied as a thin film, readily absorb oxygen from the air and polymerize to form a relatively tough, elastic film. Drying oils are usually natural products from renewable resources such as linseed oil, tung oil, soybean oil, tall oil, dehydrated castor oil, and the like which are included as combinations of such natural oils or their fatty acids in various synthetic resins. The drying ability is due to the presence of unsaturated fatty acids, especially linoleic and linolenic, frequently in the form of glycerides but also as their corresponding carboxylic acids.

Printing inks utilize a vehicle as a carrier for the pigment. The vehicle is required to wet the pigment by displacing air at the pigment surface, it is also responsible for getting the pigment to the substrate and holding it there, as well as contributing greatly to the final gloss, setting and various other properties in the ink film. Traditionally, such vehicles have been made from solvents, vegetable oils, resins (both liquid and hard) and may include other components such as co-solvents, theological modifiers, driers and anti-oxidants. The most commonly utilized vehicle for paste printing inks has been based upon petroleum distillates as the major solvent. Inks containing petroleum distillates as a solvent contain a non-renewable resource and emit organic vapors during the handling and drying processes.

SUMMARY OF THE INVENTION

Among the various aspects of the invention are uses of oil compositions as drying oils, in ink compositions and coatings, and uses of epoxidized oil compositions as plasticizers and thermal stabilizers for halogenated polymers.

One of the various aspects is an ink composition comprising a pigment and a heat treated oil composition, wherein the oil composition prior to heat treatment comprises at least 5.5 wt. % of at least one polyunsaturated fatty acid having four or more carbon-carbon double bonds or a derivative thereof based upon the total weight of fatty acids or derivatives thereof in the oil composition, wherein the oil composition is derived from a plant.

Preferably, the heat treatment does not substantially change the oil composition such that heat treated oil compositions comprises at least 5.5 wt. % of at least one polyunsaturated fatty acid having four or more carbon-carbon double bonds or a derivative thereof based upon the total weight of fatty acids or derivatives thereof in the heat treated oil composition, wherein the heat treated oil composition is derived from a plant.

Another aspect is an ink composition comprising a pigment and a heat treated oil composition, wherein the oil composition prior to heat treatment comprises at least 5.5 wt. % of at least one polyunsaturated fatty acid having four or more carbon-carbon double bonds or a derivative thereof based upon the total weight of fatty acids or derivatives thereof in the oil composition, wherein the oil composition is derived from a non-animal source.

Preferably, the heat treatment does not substantially change the oil composition such that heat treated oil compositions comprises at least 5.5 wt. % of at least one polyunsaturated fatty acid having four or more carbon-carbon double bonds or a derivative thereof based upon the total weight of fatty acids or derivatives thereof in the heat treated oil composition, wherein the heat treated oil composition is derived from a non-animal source.

Another aspect is an ink composition comprising a pigment and a heat treated oil composition, wherein the oil composition prior to heat treatment comprises at least 0.5 wt. % of at least one polyunsaturated fatty acid having four or more carbon-carbon double bonds or a derivative thereof based upon the total weight of fatty acids or derivatives thereof in the oil composition, wherein the oil composition is derived from genetically-modified seeds.

Preferably, the heat treatment does not substantially change the oil composition such that heat treated oil compositions comprises at least 0.5 wt. % of at least one polyunsaturated fatty acid having four or more carbon-carbon double bonds or a derivative thereof based upon the total weight of fatty acids or derivatives thereof in the heat treated oil composition, wherein the heat treated oil composition is derived from genetically-modified seeds.

Yet another aspect is an ink composition comprising a pigment and a heat treated oil composition, wherein the oil composition prior to heat treatment comprises at least 0.5 wt.

% of at least one polyunsaturated fatty acid having four or more carbon-carbon double bonds or a derivative thereof based upon the total weight of fatty acids or derivatives thereof in the oil composition, wherein the oil composition is derived from soy or canola oil.

Preferably, the heat treatment does not substantially change the oil composition such that heat treated oil compositions comprises at least 0.5 wt. % of at least one polyunsaturated fatty acid having four or more carbon-carbon double bonds or a derivative thereof based upon the total weight of fatty acids or derivatives thereof in the heat treated oil composition, wherein the heat treated oil composition is derived from soy or canola oil.

A further aspect is an ink composition comprising a pigment and a heat treated oil composition, wherein the oil composition prior to heat treatment comprises at least 5.5 wt. % of at least one polyunsaturated fatty acid having four or more carbon-carbon double bonds or a derivative thereof and at least 16.5 wt. % of linoleic acid or a derivative thereof based upon the total weight of fatty acids or derivatives thereof in the composition.

Preferably, the heat treatment does not substantially change the oil composition such that heat treated oil compositions comprises at least 5.5 wt. % of at least one polyunsaturated fatty acid having four or more carbon-carbon double bonds or a derivative thereof and at least 16.5 wt. % of linoleic acid or a derivative thereof based upon the total weight of fatty acids or derivatives thereof in the heat treated oil composition.

Another aspect is an ink composition comprising a pigment and a heat treated oil composition, wherein the oil composition prior to heat treatment comprises at least 5.5 wt. % of at least one polyunsaturated fatty acid having four or more carbon-carbon double bonds or a derivative thereof, less than 14.5 wt. % of palmitic acid or a derivative thereof, and at least 3.5 wt. % linoleic acid or a derivative thereof based upon the total weight of fatty acids or derivatives thereof in the oil composition.

Preferably, the heat treatment does not substantially change the oil composition such that heat treated oil compositions comprises at least 5.5 wt. % of at least one polyunsaturated fatty acid having four or more carbon-carbon double bonds or a derivative thereof, less than 14.5 wt. % of palmitic acid or a derivative thereof, and at least 3.5 wt. % linoleic acid or a derivative thereof based upon the total weight of fatty acids or derivatives thereof in the heat treated oil composition.

Yet another aspect is an ink composition comprising a pigment and a heat treated oil composition, wherein the oil composition prior to heat treatment comprises at least 7.5 wt. % stearidonic acid or a derivative thereof based upon the total weight of fatty acids or derivatives thereof in the oil composition.

Preferably, the heat treatment does not substantially change the oil composition such that heat treated oil compositions comprises at least 7.5 wt. % stearidonic acid or a derivative thereof based upon the total weight of fatty acids or derivatives thereof in the heat treated oil composition.

A further aspect is an ink composition comprising a pigment and a heat treated oil composition, wherein the oil composition prior to heat treatment comprises at least 20 wt. % gamma-linolenic acid or a derivative thereof based upon the total weight of fatty acids or derivatives thereof in the oil composition.

Preferably, the heat treatment does not substantially change the oil composition such that heat treated oil compositions comprises at least 20 wt. % gamma-linolenic acid or a derivative thereof based upon the total weight of fatty acids or derivatives thereof in the heat treated oil composition.

Yet another aspect is an ink composition comprising a pigment, an oil composition, and a resin, wherein the oil composition comprises at least 5.5 wt. % of at least one polyunsaturated fatty acid having four or more carbon-carbon double bonds or a derivative thereof based upon the total weight of fatty acids or derivatives thereof in the oil composition, wherein the oil composition is derived from a plant.

Yet another aspect is an ink composition comprising a pigment, an oil composition, and a resin, wherein the oil composition comprises at least 5.5 wt. % of at least one polyunsaturated fatty acid having four or more carbon-carbon double bonds or a derivative thereof based upon the total weight of fatty acids or derivatives thereof in the oil composition, wherein the oil composition is derived from a non-animal source.

A further aspect is an ink composition comprising a pigment, an oil composition, and a resin, wherein the oil composition comprises at least 0.5 wt. % of at least one polyunsaturated fatty acid having four or more carbon-carbon double bonds or a derivative thereof based upon the total weight of fatty acids or derivatives thereof in the oil composition, wherein the oil composition is derived from genetically-modified seeds.

Yet another aspect is an ink composition comprising a pigment, an oil composition, and a resin, wherein the oil composition comprises at least 0.5 wt. % of at least one polyunsaturated fatty acid having four or more carbon-carbon double bonds or a derivative thereof based upon the total weight of fatty acids or derivatives thereof in the oil composition, wherein the oil composition is derived from soy or canola oil.

A further aspect is an ink composition comprising a pigment, an oil composition, and a resin, wherein the oil composition comprises at least 5.5 wt. % of at least one polyunsaturated fatty acid having four or more carbon-carbon double bonds or a derivative thereof and at least 16.5 wt. % of linoleic acid or a derivative thereof based upon the total weight of fatty acids or derivatives thereof in the oil composition.

Another aspect is an ink composition comprising a pigment, an oil composition, and a resin, wherein the oil composition comprises at least 5.5 wt. % of at least one polyunsaturated fatty acid having four or more carbon-carbon double bonds or a derivative thereof, less than 14.5 wt. % of palmitic acid or a derivative thereof, and at least 3.5 wt. % linoleic acid or a derivative thereof based upon the total weight of fatty acids or derivatives thereof in the oil composition.

Yet another aspect is an ink composition comprising a pigment, an oil composition, and a resin, wherein the oil composition comprises at least 7.5 wt. % stearidonic acid or a derivative thereof based upon the total weight of fatty acids or derivatives thereof in the oil composition.

A further aspect is an ink composition comprising a pigment, an oil composition, and a resin, wherein the oil composition comprises at least 20 wt. % gamma-linolenic acid or a derivative thereof based upon the total weight of fatty acids or derivatives thereof in the oil composition.

Another aspect is a printed substrate comprising an ink or coating on at least one surface thereof or a method of printing comprising printing a substrate with an ink or coating, the ink or coating comprising an oil composition comprising at least about 7.5 wt. % stearidonic acid or a derivative thereof based upon the total weight of fatty acids or derivatives thereof in the oil composition.

A further aspect is a printed substrate comprising an ink or coating on at least one surface thereof or a method of printing comprising printing a substrate with an ink or coating, the ink or coating comprising an oil composition comprising at least about 0.5 wt. % stearidonic acid or a derivative thereof based upon the total weight of fatty acids or derivatives thereof in the oil composition wherein the stearidonic acid is derived from a transgenic plant source.

Yet another aspect is a printed substrate comprising an ink or coating on at least one surface thereof or a method of printing comprising printing a substrate with an ink or coating, the ink or coating comprising an oil composition comprising at least 20 wt. % gamma-linolenic acid or a derivative thereof based upon the total weight of fatty acids or derivatives thereof in the composition.

One of the various aspects is an oil composition comprising at least one polyunsaturated fatty acid having three or more carbon-carbon double bonds or a derivative thereof, wherein the double bonds of the unsaturated fatty acid or fatty acids in the composition are substantially epoxidized, and wherein the composition comprises at least 5.5 wt. % of at least one polyunsaturated fatty acid having four or more carbon-carbon double bonds or a derivative thereof based upon the total weight of fatty acids or derivatives thereof in the composition, wherein the oil composition is derived from a plant.

Another of the various aspects is an oil composition comprising at least one polyunsaturated fatty acid having three or more carbon-carbon double bonds or a derivative thereof, wherein the double bonds of the unsaturated fatty acid or fatty acids in the composition are substantially epoxidized, and wherein the composition comprises at least 5.5 wt. % of at least one polyunsaturated fatty acid having four or more carbon-carbon double bonds or a derivative thereof based upon the total weight of fatty acids or derivatives thereof in the composition, wherein the oil composition is derived from a non-animal source.

Yet another of the various aspects is an oil composition comprising at least one polyunsaturated fatty acid having three or more carbon-carbon double bonds or a derivative thereof, wherein the double bonds of the unsaturated fatty acid or fatty acids in the composition are substantially epoxidized, and wherein the composition comprises at least 0.5 wt. % of at least one polyunsaturated fatty acid having four or more carbon-carbon double bonds or a derivative thereof based upon the total weight of fatty acids or derivatives thereof in the composition, wherein the oil composition is derived from genetically-modified seeds.

A further aspect of the invention is an oil composition comprising at least one polyunsaturated fatty acid having three or more carbon-carbon double bonds or a derivative thereof, wherein the double bonds of the unsaturated fatty acid or fatty acids in the composition are substantially epoxidized, and wherein the composition comprises at least 0.5 wt. % of at least one polyunsaturated fatty acid having four or more carbon-carbon double bonds or a derivative thereof based upon the total weight of fatty acids or derivatives thereof in the composition, wherein the oil composition is derived from soy or canola oil.

Another aspect is an oil composition comprising at least one polyunsaturated fatty acid having three or more carbon-carbon double bonds or a derivative thereof, wherein the double bonds of the unsaturated fatty acid or fatty acids in the composition are substantially epoxidized, and wherein the composition comprises at least 5.5 wt. % of at least one polyunsaturated fatty acid having four or more carbon-carbon double bonds or a derivative thereof and at least 16.5 wt. % of linoleic acid or a derivative thereof based upon the total weight of fatty acids or derivatives thereof in the composition.

Yet another aspect is an oil composition comprising at least one polyunsaturated fatty acid having three or more carbon-carbon double bonds or a derivative thereof, wherein the double bonds of the unsaturated fatty acid or fatty acids in the composition are substantially epoxidized, and wherein the composition comprises at least 5.5 wt. % of at least one polyunsaturated fatty acid having four or more carbon-carbon double bonds or a derivative thereof, less than 14.5 wt. % of palmitic acid or a derivative thereof, and at least 3.5 wt. % linoleic acid or a derivative thereof based upon the total weight of fatty acids or derivatives thereof in the composition.

A further aspect is an oil composition comprising at least one polyunsaturated fatty acid having three or more carbon-carbon double bonds or a derivative thereof, wherein the double bonds of the unsaturated fatty acid or fatty acids in the composition are substantially epoxidized, and wherein the composition comprises at least 7.5 wt. % stearidonic acid or a derivative thereof based upon the total weight of fatty acids or derivatives thereof in the composition.

Another aspect of the invention is an oil composition comprising at least one polyunsaturated fatty acid having three or more carbon-carbon double bonds or a derivative thereof, wherein the double bonds of the unsaturated fatty acid or fatty acids in the composition are substantially epoxidized, and wherein the composition comprises at least 20 wt. % gamma-linolenic acid or a derivative thereof based upon the total weight of fatty acids or derivatives thereof in the composition.

Yet another aspect of the invention is the use of the oil compositions described above as plasticizers for polyvinyl chloride.

Yet another aspect is a paint composition comprising a pigment and a drying oil or a method for coating a substrate comprising applying a coating composition to the substrate, wherein the coating composition comprises a drying oil composition comprising at least one polyunsaturated fatty acid having three or more carbon-carbon double bonds or a derivative thereof, and wherein the drying oil composition comprises at least 5.5 wt. % of at least one polyunsaturated fatty acid having four or more carbon-carbon double bonds or a derivative thereof based upon the total weight of fatty acids or derivatives thereof in the drying oil composition, wherein the drying oil composition is derived from a plant.

Yet another aspect of the invention is a paint composition comprising a pigment and a drying oil or a method for coating a substrate comprising applying a coating composition to the substrate, wherein the coating composition comprises a drying oil composition comprising at least one polyunsaturated fatty acid having three or more carbon-carbon double bonds or a derivative thereof, and wherein the drying oil composition comprises at least 5.5 wt. % of at least one polyunsaturated fatty acid having four or more carbon-carbon double bonds or a derivative thereof based upon the total weight of fatty acids or derivatives thereof in the drying oil composition, wherein the drying oil composition is derived from a non-animal source.

A further aspect is a paint composition comprising a pigment and a drying oil or a method for coating a substrate comprising applying a coating composition to the substrate, wherein the coating composition comprises a drying oil composition comprising at least one polyunsaturated fatty acid having three or more carbon-carbon double bonds or a derivative thereof, and wherein the drying oil composition comprises at least 0.5 wt. % of at least one polyunsaturated fatty acid having four or more carbon-carbon double bonds or a derivative thereof based upon the total weight of fatty acids or derivatives thereof in the drying oil composition, wherein the drying oil composition is derived from genetically-modified seeds.

Yet another aspect is a paint composition comprising a pigment and a drying oil or a method for coating a substrate comprising applying a coating composition to the substrate, wherein the coating composition comprises a drying oil composition comprising at least one polyunsaturated fatty acid having three or more carbon-carbon double bonds or a derivative thereof, and wherein the drying oil composition comprises at least 0.5 wt. % of at least one polyunsaturated fatty acid having four or more carbon-carbon double bonds or a derivative thereof based upon the total weight of fatty acids or derivatives thereof in the drying oil composition, wherein the drying oil composition is derived from soy or canola oil.

Another aspect is a paint composition comprising a pigment and a drying oil or a method for coating a substrate comprising applying a coating composition to the substrate, wherein the coating composition comprises a drying oil composition comprising at least one polyunsaturated fatty acid having three or more carbon-carbon double bonds or a derivative thereof, and wherein the drying oil composition comprises at least 5.5 wt. % of at least one polyunsaturated fatty acid having four or more carbon-carbon double bonds or a derivative thereof and at least 16.5 wt. % of linoleic acid or a derivative thereof based upon the total weight of fatty acids or derivatives thereof in the drying oil composition.

Yet another aspect of the invention is a paint composition comprising a pigment and a drying oil or a method for coating a substrate comprising applying a coating composition to the substrate, wherein the coating composition comprises a drying oil composition comprising at least one polyunsaturated fatty acid having three or more carbon-carbon double bonds or a derivative thereof, and wherein the drying oil composition comprises at least 5.5 wt. % of at least one polyunsaturated fatty acid having four or more carbon-carbon double bonds or a derivative thereof, less than 14.5 wt. % of palmitic acid or a derivative thereof, and at least 3.5 wt. % linoleic acid or a derivative thereof based upon the total weight of fatty acids or derivatives thereof in the drying oil composition.

Another aspect is a paint composition comprising a pigment and a drying oil or a method for coating a substrate comprising applying a coating composition to the substrate, wherein the coating composition comprises a drying oil composition comprising at least one polyunsaturated fatty acid having three or more carbon-carbon double bonds or a derivative thereof, and wherein the drying oil composition comprises at least 7.5 wt. % stearidonic acid or a derivative thereof based upon the total weight of fatty acids or derivatives thereof in the drying oil composition.

A further aspect of the invention is a paint composition comprising a pigment and a drying oil or a method for coating a substrate comprising applying a coating composition to the substrate, wherein the coating composition comprises a drying oil composition comprising at least one polyunsaturated fatty acid having three or more carbon-carbon double bonds or a derivative thereof, and wherein the drying oil composition comprises at least 20 wt. % gamma-linolenic acid or a derivative thereof based upon the total weight of fatty acids or derivatives thereof in the drying oil composition.

Other objects and features will be in part apparent and in part pointed out hereinafter.

DETAILED DESCRIPTION

High polyunsaturated fatty acid (PUFA) oils have various unique characteristics that make them ideally suited to use as additives in various compositions. For example, epoxidized high PUFA oils can be used as plasticizers. In particular, they can be used as plasticizers for polyvinyl chloride (PVC). Further, high PUFA oils can be used as drying oils in various coatings, particularly coatings for wood products. Additionally, high PUFA oils can be used in ink compositions.

Oils Having a High Concentration of Polyunsaturated Fatty Acids

In various embodiments of the present invention, the following oil compositions are used. These oil compositions can be epoxidized using the process described below or can be used in various coating compositions as described.

In some of the various embodiments, the oil composition comprises at least about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt. % or more of at least one polyunsaturated fatty acid having four or more carbon-carbon double bonds or a derivative thereof, based on the total weight of fatty acids or derivatives thereof in the composition. In this embodiment, the oil composition is derived from genetically-modified seeds. These genetically modified seeds include seeds of *Arabidopsis*, canola, carrot, coconut, corn, cotton, flax, linseed, maize, palm kernel, peanut, potato, rapeseed, safflower, soybean, sunflower, and/or tobacco.

Further, the present invention is directed to an oil composition comprising at least about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt. % or more of at least one polyunsaturated fatty acid having four or more carbon-carbon double bonds or a derivative thereof based on the total weight of fatty acids or derivatives thereof in the composition, the composition being derived from canola or soy.

In other various embodiments, an oil composition comprises at least about 5.5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt. % or more of at least one polyunsaturated fatty acid having four or more carbon-carbon double bonds or a derivative thereof based on the total weight of fatty acids or derivatives thereof in the composition, and the oil composition is derived from a plant.

Also, the invention is directed to oil compositions comprising at least about 5.5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt. % or more of at least one polyunsaturated fatty acid having four or more carbon-carbon double bonds or a derivative thereof based on the total weight of fatty acids or derivatives thereof in the composition wherein the oil composition is derived from a non-animal source.

Oil compositions comprising at least 5.5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt. % or more of at least one polyunsaturated fatty acid having four or more carbon-carbon double bonds or a derivative thereof and at least 16.5, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt. % or more of linoleic acid or a derivative thereof based upon the total weight of fatty acids or derivatives thereof in the composition are also used.

In some embodiments, oil compositions comprising at least 5.5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt. % or more of at least one polyunsaturated fatty acid having four or more carbon-carbon double bonds or a derivative thereof, less than 14.5, 14, 13, 12, 11, 10, 9, 8, 7, 6, 5, 4, 3, 2 wt. % or less of palmitic acid or a derivative thereof and at least 3.5, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt. % or more linoleic acid or a derivative thereof based upon the total weight of fatty acids or derivatives thereof in the composition are used.

Also, in other embodiments, oil compositions of the invention comprise at least 7.5, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt. % or more stearidonic acid or a derivative thereof based upon the total weight of fatty acids or derivatives thereof in the composition.

In various embodiments, oil compositions comprising at least 20, 21, 22, 23, 24, 25, 26, 27, 28, 29, 30, 31, 32, 33, 34, 35, 36, 37, 38, 39, 40, 41, 42, 43, 44 or 45 wt. % or more gamma-linolenic acid or a derivative thereof based upon the total weight of fatty acids or derivatives thereof in the composition are used.

In yet other embodiments, oil compositions comprising from 4 wt. % to 20 wt. % alpha-linolenic acid, from 4 wt. % to 20 wt. % gamma-linolenic acid, and from 1 wt. % to 40 wt. % stearidonic acid, or derivatives thereof based upon the total weight of fatty acids or derivatives thereof in the composition are used.

Exemplary polyunsaturated fatty acids, or derivatives thereof, having three or more double bonds are ALA 18:3 (n=3), CLA (conjugated linoleic acid) (18:3), GLA 18:3 (n=6), stearidonic acid (SDA, C18:4), eicosatetraenoic acid (ETA), eicosapentaenoic acid (EPA; C20:5), docosapentaenoic acid (DPA; C22:5), docosahexaenoic acid (DHA), and arachidonic acid (AA; C20:4). Preferably, the polyunsaturated fatty acid or derivative thereof of the above described oil compositions comprises at least one omega-3 or omega-6 fatty acid, and preferably comprises omega-3 stearidonic acid (SDA; C18:4), omega-3 eicosatetraenoic acid (ETA), omega-3 eicosapentaenoic acid (EPA; C20:5), omega-3 docosapentaenoic acid (DPA; C22:5), omega-3 docosahexaenoic acid (DHA; C22:6), or omega-6 arachidonic acid (AA; C20:4).

The compositions described above in this section can further comprise γ-linolenic acid or a derivative thereof (C-γ18:3), or DH-γ-linolenic acid (C-DH-γ20:3) or a derivative thereof.

Further, the oil compositions described herein can be derived from a plant oil other than blackcurrant oil, borage oil, *Echium* oil, evening primrose oil, gooseberry oil, hemp oil, or redcurrant oil. Moreover, the composition of the oils can be derived from an oil other than fish (e.g., menhaden, sardine, tuna, cod liver, mackerel, or herring), an algal oil or other marine oils. Algal groups that produce oils with four double bonds or more include chrysophytes, crytophytes, diatoms, and dinoflagellates (Behrens and Kyle, 1996: J. Food Lipids, 3:259-272) including oils derived from *Crypthecodinium cohnii, Nitzchia* sp, *Nannochloropsis, Navicula* sp., *Phaedactylum, Porphyridium* and *Schizochytrium*.

Additionally, the oil compositions described herein can be derived from genetically-modified *Arabidopsis*, canola, carrot, coconut, corn, cotton, flax, linseed, maize, palm kernel, peanut, potato, rapeseed, safflower, soybean, sunflower, and/or tobacco. Finally, the composition of the oils described above can be an unblended oil.

Oils can also be blended (like mixtures) or interesterified to create appropriate combinations of the desired fatty acids to attain a composition having an advantageous iodine value (I.V.) or an advantageous degree of unsaturation. These compositions can be used for plasticizers or for drying oils. These oil blends can be prepared from combinations of oils listed herein, from a mono, di, or triglyceride oils, or esters of the desired fatty acids.

It has been shown that humans can synthesize omega-6 polyunsaturated fatty acids from linoleic acid (18:2) via a Δ6-desaturation pathway to yield γ-linolenic acid (18:3). Likewise, the same Δ6-desaturase can convert α-linolenic acid (18:3), an omega-3 fatty acid, to stearidonic acid (18:4), a fatty acid that retains its omega-3 functionality. Further fatty acid elongation and desaturation steps give rise to arachidonic acid, eicosapentaenoic acid, and docosahexaenoic acid. An alternative pathway for the biosynthesis of AA and EPA operates in some organisms. Here, LA and ALA are first elongated specifically to eicosadienoic acid (EDA, C20:2 ω6) and eicosatrienoic acid (EtrA, C20:3 ω3), respectively. Subsequent $\Delta^8$ and $\Delta^5$ desaturation of these products yields AA and EPA.

DHA and EPA can also be synthesized by the polyketide synthase (PKS) pathway from malonyl-CoA precursors. Yazawa, Lipids (1996) 31, S297-S300.

Recent reports demonstrate the reconstitution of these $\Delta^8$-desaturation pathways for polyunsaturated fatty acids synthesis in *Arabidopsis thaliana*, and the accumulation of appreciable quantities of AA and EPA in the transgenic plants (Qi et al., Nature Biotechnol. (2004) 22, 739-745) by sequential transfer and expression of three genes encoding a $\Delta^9$-specific elongating activity from *Isochrysis galbana* (IgASE1) (Qi et al., FEBS Lett. (2002) 510, 159-165), a $\Delta^8$-desaturase from *Euglena gracilis* (Eu$\Delta^8$) (Wallis and Browse, Arch. Biochem. Biophys. J. (1999) 365, 307-316), and a $\Delta^5$-desaturase from *Mortierella alpina* (Mort$\Delta^5$) (Michaelson et al., J. Biol. Chem. (1998) 273, 19055-19059), respectively. Also, Abbadi et al. (Plant Cell (2004) 16, 1-15) has reported the successful seed-specific production of ω3 and ω6 polyunsaturated fatty acids in transgenic tobacco (*Nicotiana tabacum*) and linseed (*Linum usitatissimum*). Pereira et al. (Biochem. J. (2004) 378 (665-671) reported a novel ω3 fatty acid desaturase involved in the biosynthesis of EPA. The extracted polyunsaturated fatty acids from organisms produced according to the above listed reports are useful for the present invention.

Some of the various oils of the present invention can be extracted from plant tissue, including plant seed tissue. Plants from which polyunsaturated fatty acids can be isolated include plants with native levels of polyunsaturated fatty acids as well as plants genetically engineered to express elevated levels of polyunsaturated fatty acids. Examples of plants with native levels of polyunsaturated fatty acids include oilseed crops, such as canola, safflower, and linseed, as well as plants such as flax, evening primrose (*Oenothera biennis*), borage (*Borago officinalis*) and black currants (*Ribes nigrum*), *Trichodesma*, and *Echium*. Certain mosses, for example *Physcomitrella patens*, are known to natively produce polyunsaturated fatty acids that can be extracted and purified. As another example, the polyunsaturated fatty acid compositions (including for example, stearidonic acid, docosahexaenoic acid, eicosapentaenoic acid, gamma linolenic acid, arachidonic acid, dihomogammalinolenic acid, docosapentaenoic acid, and octadecatetraeonic acid) can be extracted from plants and/or recombinant plants (including for example, *Arabidopsis*, canola, carrot, coconut, corn, cotton, flax, linseed, maize, palm kernel, peanut, potato, rapeseed, safflower, soybean, sunflower, tobacco, and mixtures thereof) produced with, for example, the compositions and methods of U.S. Pat. Nos. 7,241,619; 7,211,656; 7,189,894; 7,070,970; 7,045,683; 6,858,416; 6,677,145; 6,683,232; 6,635,451; 6,566,583; 6,459,018; 6,432,684; 6,355,861; 6,075,183; 5,977,436; 5,972,664; 5,968,809; 5,959,175;

5,689,050; 5,614,393; 5,552,306; and 5,443,974, as well as WO 02/26946; WO 98/55625; WO 96/21022, and also U.S. Patent App. Ser. Nos. 2006/0265778; 2006/0156435; 20040078845; 20030163845; and 20030082754 (the prior references are herein incorporated by reference).

Other oil compositions can be extracted from fungi. Fungi from which polyunsaturated fatty acids can be isolated include fungi with native levels of polyunsaturated fatty acids as well as fungi genetically engineered to express elevated levels of polyunsaturated fatty acids. For example, oils having polyunsaturated fatty acid (including stearidonic acid, docosahexaenoic acid, eicosapentaenoic acid, gamma linolenic acid, arachidonic acid, dihomogammalinolenic acid, docosapentaenoic acid, and octadecatetraeonic acid) can be extracted from fungi and/or recombinant fungi (including for example, *Saccharomyces* (including *S. cerevisiae* and *S. carlsbergensis*), *Candida* spp., *Cunninghamella* spp. (including *C. elegans, C. blakesleegna*, and *C. echinulate*), *Lipomyces starkey, Yarrowia lipolytica, Kluyveromyces* spp., *Hansenula* spp., *Aspergillus* spp., *Penicillium* spp., *Neurospora* spp., *Saprolegnia diclina, Trichoderma* spp., *Thamnidium elegans, Pichia* spp., *Pythium* spp. (including *P. ultimum, P. debaryanum, P. irregulare*, and *P. insidiosum*), *Thraustochytrium aureum*, and *Mortierella* spp. (including *M. elongata, M. exigua, M. hygrophila, M. ramanniana, M. ramanniana* var. *angulispora, M. ramanniana* var. nana, *M. alpina, M. isabellina*, and *M. vinacea*)) produced with, for example, the compositions and methods of U.S. Pat. Nos. 7,241,619; 7,211,656; 7,189,894; 7,070,970; 6,858,416; 6,677,145; 6,635,451; 6,607,900; 6,566,583; 6,432,684; 6,410,282; 6,355,861; 6,280,982; 6,255,505; 6,136,574; 5,972,664; 5,968,809; 5,658,767; 5,614,393; 5,376,541; 5,246,842; 5,026,644; 4,871,666; and 4,783,408; as well as WO 02/26946; and also U.S. Patent App. Ser. Nos. 20040078845; 20030163845; and 20030082754 (the prior references are herein incorporated by reference).

Yet other oil compositions can be extracted from microorganisms. Microorganisms from which polyunsaturated fatty acids can be isolated include microorganisms with native levels of polyunsaturated fatty acids as well as microorganisms genetically engineered to express elevated levels of polyunsaturated fatty acids. Such microorganisms include bacteria and cyanobacteria. For example, oils having polyunsaturated fatty acid (including stearidonic acid, docosahexaenoic acid, eicosapentaenoic acid, gamma linolenic acid, arachidonic acid, dihomogammalinolenic acid, docosapentaenoic acid, and octadecatetraeonic acid) can be extracted from microorganisms and/or recombinant microorganisms, including for example *E. coli, Cyanobacteria, Lactobacillus*, and *Bacillus subtilis*, produced with, for example, the compositions and methods of U.S. Pat. Nos. 7,189,894; 7,070,970; 6,858,416; 6,677,145; 6,635,451; 6,607,900; 6,566,583; 6,432,684; 5,972,664; 5,614,393; and 5,552,306, as well as WO 02/26946; and also U.S. Patent App. Ser. Nos. 20040078845; 20030180898; 20030163845; and 20030082754 (the prior references are herein incorporated by reference).

Additionally, oil compositions can be extracted from algae. Algae from which polyunsaturated fatty acids can be isolated include algae with native levels of polyunsaturated fatty acids as well as algae genetically engineered to express elevated levels of polyunsaturated fatty acids. Examples of algae with native levels of polyunsaturated fatty acids include *Phaeodactylum tricornutum, Crypthecodinium cohnii, Pavlova, Isochrysis galbana*, and *Thraustochytrium*. For example, oils having polyunsaturated fatty acids (including stearidonic acid, docosahexaenoic acid, eicosapentaenoic acid, gamma linolenic acid, arachidonic acid, dihomogammalinolenic acid, docosapentaenoic acid, and octadecatetraeonic acid) can be extracted from alga and/or recombinant alga produced with, for example, the compositions and methods of U.S. Pat. Nos. 7,070,970; 7,045,683; 6,986,323; 6,727,373; 6,607,900; 6,566,583; 6,255,505; 6,136,574; 5,972,664; 5,968,809; 5,547,699; and 5,407,957; and also U.S. Patent App. Ser. Nos. 20030180898; and 20030163845 (the prior references are herein incorporated by reference).

In order to prepare the oil compositions described above, the following steps are generally used to process seed oils: preparation, cracking and dehulling, conditioning, milling, flaking or pressing, extracting, degumming, refining, bleaching and deodorizing. Each of these steps will be discussed in more detail herein below. This discussion details the current commercial process for each of the steps. A person of ordinary skill would know that the steps could be combined, used in a different order or otherwise modified.

Generally, the preparation step includes the initial seed cleaning process, which removes stones, dirt, sticks, worms, insects, metal fragments, and other debris collected during the harvest and storage of the seeds. Extraneous matter as described above can affect the quality of the final seed oil by containing compounds that negatively impact its chemical stability. Preferably, ripe, unbroken seeds having reduced levels of chlorophyll, are properly dried and with reduced levels of free fatty acids are used.

After the preparation step, the seeds are cracked and dehulled. Cracking and dehulling can be accomplished in a variety of ways, which are well known in the art. For example, the seeds can be cracked and dehulled using a seed cracker, which mechanically breaks the seeds and releases hulls and generates some fines. After cracking, the hulls and fines can be separated from the seed meats by a dehuller. In one aspect, the dehuller can separate the hulls from the seed meats due to the density difference between the hulls and the seeds; the hulls are less dense than the seed meats. For example, aspiration will separate the hulls from the cracked seed meats. Dehulling reduces the crude fiber content, while increasing the protein concentration of the extracted seed meats. Optionally, after dehulling, the hulls can be sieved to recover the fines generated in the cracking of the seeds. After recovery, the fines can be added back to the seed meats prior to conditioning or they can be added directly to the extractor.

Once the seeds are cracked, the oxygen exposure of the seed meats can optionally be minimized, which would reduce oil oxidation and improve oil quality. Furthermore, it will be understood by persons skilled in the art that minimization of oxygen exposure may occur independently at each of the subsequently disclosed oilseed processing steps.

Once the seeds are cracked and dehulled, they are conditioned to make the seed meats pliable prior to further processing. Furthermore, the conditioning promotes rupturing of oil bodies. Further processing, in terms of flaking, grinding or other milling technology is made easier by having pliable seed meats at this stage. Generally, the seed meats have moisture removed or added in order to reach a 6-14 wt. % moisture level. If moisture is removed, this process is called toasting or drying and if moisture is added, this process is called cooking or tempering. Typically, the seed meats are heated to 40-90° C. with steam which is dry or wet depending on the direction of adjustment of the moisture content of the seed meats. In some instances, the conditioning step occurs under conditions minimizing oxygen exposure or at lower temperatures for seeds having high PUFA levels.

Once the seed meats are conditioned, they can be milled to a desired particle size or flaked to a desired surface area. In certain cases, the flaking or milling occurs under conditions minimizing oxygen exposure. Flaking or milling is done to increase the surface area of the seed meats and also rupture the oil bodies thereby facilitating a more efficient extraction. Many milling technologies are appropriate and are well known in the art. The considerations when choosing a method of milling and a particle size for the ground seed are contingent upon, but not limited to the oil content in the seed and the desired efficiency of the extraction of the seed meats or the seed. When flaking the seed meats, the flakes are typically from about 0.1 to about 0.5 mm thick; from about 0.1 to about 0.35 mm thick; from about 0.3 to about 0.5 mm thick; or from about 0.2 to about 0.4 mm thick.

Optionally, after the seed meats are milled, they can be pressed. Typically, the seed meats are pressed when the oil content of the seed meats is greater than about 30 wt. % of the seeds. However, seeds with higher or lower oil contents can be pressed. The seed meats can be pressed, for example, in a hydraulic press or mechanical screw. Typically, the seed meats are heated to less than about 55° C. upon the input of work. When pressed, the oil in the seed meats is pressed through a screen, collected and filtered. The oil collected is the first press oil. The seed meats from after pressing are called seed cake; the seed cake contains oil and can be subjected to solvent extraction.

After milling, flaking or optional pressing, the oil can be extracted from the seed meats or seed cake by contacting them with a solvent. Preferably, n-hexane or iso-hexane is used as the solvent in the extraction process. Typically, the solvent is degassed prior to contact with the oil. This extraction can be carried out in a variety of ways, which are well known in the art. For example, the extraction can be a batch or continuous process and desirably is a continuous counter-current process. In a continuous counter-current process, the solvent contact with the seed meat leaches the oil into the solvent, providing increasingly more concentrated miscellas (i.e., solvent-oil), while the marc (i.e., solvent-solids) is contacted with miscellas of decreasing concentration. After extraction, the solvent is removed from the miscella in a manner well known in the art. For example, distillation, rotary evaporation or a rising film evaporator and steam stripper can be used for removing the solvent. After solvent removal, if the crude oil still contains residual solvent, it can be heated at about 95° C. under reduced pressure at about 60 mmHg.

The above processed crude oil contains hydratable and nonhydratable phosphatides. Accordingly, the crude oil is degummed to remove the hydratable phosphatides by adding water and heating to from about 40 to about 75° C. for approximately 5-60 minutes depending on the phosphatide concentration. Optionally, phosphoric acid and/or citric acid can be added to convert the nonhydratable phosphatides to hydratable phosphatides. Phosphoric acid and citric acid form metal complexes, which decreases the concentration of metal ions bound to phosphatides (metal complexed phosphatides are nonhydratable) and thus, converts nonhydratable phosphatides to hydratable phosphatides. Optionally, after heating with water, the crude oil and water mixture can be centrifuged to separate the oil and water, followed by removal of the water layer containing the hydratable phosphatides. Generally, if phosphoric acid and/or citric acid are added in the degumming step, about 1 wt. % to about 5 wt. %; preferably, about 1 wt. % to about 2 wt. %; more preferably, about 1.5 wt. % to about 2 wt. % are used. This process step is optionally carried out by degassing the water and phosphoric acid before contacting them with the oil to remove oxygen in order to minimize oxidation thus maximizing oil quality.

Furthermore, the crude oil contains free fatty acids (FFAs), which can be removed by a chemical (e.g., caustic) refining step. When FFAs react with basic substances (e.g., caustic) they form carboxylic acid salts or soaps that can be extracted into aqueous solution. Thus, the crude oil is heated to about 40 to about 75° C. and NaOH is added with stirring and allowed to react for approximately 10 to 45 minutes. This is followed by stopping the stirring while continuing heat, removing the aqueous layer, and treating the neutralized oil to remove soaps. The oil is treated by water washing the oil until the aqueous layer is of neutral pH, or by treating the neutralized oil with a silica or ion exchange material. The oil is dried at about 95° C. and about 10 mmHg. In some instances, the caustic solution is degassed before it contacts the oil.

Alternatively, rather than removing FFAs from the oil by chemical refining, the FFAs can be removed by physical refining. For example, the oil can be physically refined during deodorization. When physical refining is performed, the FFAs are removed from the oil by vacuum distillation performed at low pressure and relatively higher temperature. Generally, FFAs have lower molecular weights than triglycerides and thus, FFAs generally have lower boiling points and can be separated from triglycerides based on this boiling point difference and through aid of nitrogen or steam stripping used as an azeotrope or carrier gas to sweep volatiles from the deodorizers.

Typically, when physical refining rather than chemical refining is performed, oil processing conditions are modified to achieve similar final product specifications. For example, when an aqueous acidic solution is used in the degumming step, a higher concentration of acid (e.g., up to about 100% greater concentration, preferably about 50% to about 100% greater concentration) may be needed due to the greater concentration of non-hydratable phosphatides that could otherwise be removed in a chemical refining step. In addition, a greater amount of bleaching material (e.g., up to about 100% greater amount, preferably about 50 to about 100% greater amount) is used.

Before bleaching citric acid (50 wt. % solution) can be added at a concentration of about 0.01 wt. % to about 5 wt. % to the degummed oil and/or chemically refined oil. This mixture can then be heated at a temperature of about 35° C. to about 65° C. and a pressure of about 1 mmHg to about 760 mmHg for about 5 to about 60 minutes.

The degummed oil and/or chemically refined oil is subjected to an absorption process (e.g., bleached) to remove peroxides, oxidation products, phosphatides, keratinoids, chlorphyloids, color bodies, metals and remaining soaps formed in the caustic refining step or other processing steps. The bleaching process comprises heating the degummed oil or chemically refined oil under vacuum of about 0.1 mmHg to about 200 mmHg and adding a bleaching material appropriate to remove the above referenced species (e.g., neutral earth (commonly termed natural clay or fuller's earth), acid-activated earth, activated clays and silicates) and a filter aid, whereupon the mixture is heated to about 75-125° C. and the bleaching material is contacted with the degummed oil and/or chemically refined oil for about 5-50 minutes. It can be advantageous to degas the bleaching material before it contacts the refined oil. The amount of bleaching material used is from about 0.25 wt. % to about 3 wt. %, preferably about 0.25 wt. % to about 1.5 wt. %, and more preferably about 0.5 wt. % to about 1 wt. %. After heating, the bleached oil or refined, bleached oil is filtered and deodorized.

The bleached oil or refined, bleached oil is deodorized to remove compounds with strong odors and flavors as well as remaining free fatty acids. The color of the oil can be further reduced by heat bleaching at elevated temperatures. Deodorization can be performed by a variety of techniques including batch and continuous deodorization units such as batch stirred tank reactors, falling film evaporators, wiped film evaporators, packed column deodorizers, tray type deodorizers, and loop reactors. Typically, a continuous deodorization process is preferred. Generally, deodorization conditions are performed at about 160 to about 270° C. and about 0.002 to about 1.4 kPa. For a continuous process, particularly in a continuous deodorizer having successive trays for the oil to traverse, a residence time of up to 2 hours at a temperature from about 170° C. to about 265° C.; a residence time of up to about 30 minutes at a temperature from about 240° C. to about 250° C. is preferred. Deodorization conditions can use carrier gases for the removal of volatile compounds (e.g., steam, nitrogen, argon, or any other gas that does not decrease the stability or quality of the oil).

Furthermore, when physical rather than chemical refining is used, a greater amount of FFAs are removed during the deodorization step, and the deodorizer conditions are modified to facilitate the removal of free fatty acids. For example, the temperature is increased by about 25° C.; oils can be deodorized at temperatures ranging from about 165° C. to about 300° C. In particular, oils can be deodorized at temperatures ranging from about 250° C. to about 280° C. or about 175° C. to about 205° C. In addition, the retention time of the oil in the deodorizer is increased by up to about 100%. For example, the retention time can range from less than about 1, 5, 10, 30, 60, 90, 100, 110, 120, 130, 150, 180, 210 or 240 minutes. Additionally, the deodorizer pressure can be reduced to less than about $3\times10^{-4}$, $1\times10^{-3}$, $5\times10^{-3}$, 0.01, 0.02, 0.03, 0.04, 0.05, 0.06, 0.07, 0.08, 0.09, or 0.1 kPa. The deodorization step results in refined, bleached and deodorized (RBD) oil.

Optionally, RBD oils can be stabilized by partial hydrogenation and/or by the addition of stabilizers or by minimizing the removal or degradation of microcomponents that aid in maintaining oil stability and quality. Partial hydrogenation stabilizes an oil by reducing the number of double bonds in the fatty acids contained in the oil and thus, reducing the chemical reactivity of the oil. However, partial hydrogenation can increase the concentration of undesirable trans-fatty acids.

Stabilizers generally act to intercept free radicals formed during oxidation. Interception of the free radicals by stabilizers, which become either more stable free radicals or rearrange to become stable molecules, slows the oxidation of the oil due to the decreased concentration of highly reactive free radicals that can oxidize more fatty acid units.

For each of the above steps, at each step the exposure to oxygen was optionally minimized, the exposure to heat was optionally minimized, the exposure to UV light was optionally minimized and optionally, stabilizers were added to the seed meats or seed oil before, during, or after processing. These and other process improvements for preparing oils of the present invention are described and exemplified in U.S. patent application Ser. No. 11/267,810 entitled "Processes for Preparation of Oil Compositions" filed Nov. 4, 2005, which is incorporated by reference herein in its entirety.

Plasticizers/Thermal Stabilizers

Plasticizers are additives in plastics that soften these plastics to provide the desired flexibility. Plasticizers work by embedding themselves between the chains of polymers, spacing them apart (increasing of the "free volume"), and thus significantly lowering the glass transition temperature for the plastic and making it softer. For plastics such as polyvinyl chloride (PVC), the more plasticizer added, the lower its cold flex temperature will be.

Plasticized PVC and unplasticized PVC are used for various applications. Substantially unplasticized PVC, commonly known as rigid PVC, is used for pipe work, ducts, and similar applications in which high resistance to chemical substances is required. Plasticized PVC is widely useful for numerous applications including films, sheeting, cable coverings, moldings, stationary products, conveyor belting, toys, and hose. Plasticized PVC is also used as a substitute for leather and may be used as a fabric for clothing and various furnishings.

Thermal stabilizers are needed in PVC formulations because at typical extrusion processing temperatures, a PVC polymer undergoes slow elimination of hydrochloric acid from labile beta hydrogen atoms. This leads to formation of isolated double bonds followed by fast allyl activated dehydrohalogenation resulting in the formation of dark colored conjugated polyenes. This degradation, if not controlled, is auto-catalytic.

Plasticizer and thermal stabilizer levels are quantified in terms of parts per hundred resin or phr. Typical formulations for various applications are given in the *Handbook of Plasticizers* (George Wypych ed. ChemTec Publishing, 2004). For example, a basic European topcoat formulation for flooring applications includes 44 phr of plasticizer and 2.4 phr of epoxidized soybean oil as well as a tin stabilizer (pg 421). For applications requiring more flexibility, a higher level of plasticizer is incorporated into the formulation. For example for flexible medical products such as IV tubing and blood bags, Wypych lists a formulation containing 120 phr of plasticizer (tri-2-ethylhexyl trimellitate) and 5 phr of epoxidized soy oil as well as other minor components.

Unmodified vegetable oils are largely incompatible with polyvinyl chloride resin. However, certain modified derivatives of vegetable oils, such as epoxidized soybean oil, are compatible with PVC resin and provide an alternative to petroleum-based plasticizers. Furthermore, vegetable oils are derived from a renewable source, namely plants, and are not likely to create the potential for physiological disturbances or other injuries to persons coming into contact with products which require plasticizers in their composition.

Epoxidized soybean oil has poor compatibility with the PVC resin matrix at high levels. Typically, epoxidized soybean oil is not compatible with PVC resin if the epoxidized soybean oil exceeds 5-15% of the total composition. Because primary plasticizers often represent up to 50% of the PVC matrix, a useful oil must be modified to significantly improve its compatibility with PVC resins while maintaining advantageous thermal stabilizing properties of the oil.

The oil compositions of the present invention are epoxidized for several reasons. Firstly, the fatty acid esters of typical vegetable oils are minimally compatible (i.e., minimally soluble) with PVC resin. However, these compounds become compatible with PVC when their long chain fatty acid groups are epoxidized. In the present invention, increasing compatibility of the oil compositions with PVC resin by means of substantially complete esterification and substantially full epoxidation results in low migration and exudation rates of this material in PVC resins or matrices.

An additional reason for epoxidizing oil composition plasticizers is that epoxide functionality significantly contributes to the thermal stability of the PVC matrix. Commercially available epoxidized soybean oil is typically used in concentrations of about 2 to 5% in PVC resins, and is used as a secondary thermal stabilizer in combination with certain metal salts or organic stabilizers (typically phenols), which are considered the primary thermal stabilizers in PVC matrices. In current industrial formulations, various phthalate compounds serve as the primary plasticizer, but do not contribute to thermal stability, whereas typical epoxidized soybean oil is included only for its thermal stabilization functionality.

The oil compositions described above can be epoxidized by combining the oil with formic acid and hydrogen peroxide in the presence of an acid resin, typically in an inert atmosphere. The epoxidation of the double bonds of the fatty acids in the oil takes place over time and preferably, upon reaction completion, the double bonds in the oil composition are substantially epoxidized.

The present invention provides oil compositions which are typically useful alone as a primary plasticizer and also fulfill a dual role as both the primary plasticizer and the thermal stabilizer. In alternate embodiments, metal salts may be added to further enhance thermal stability. When the vegetable oil or soybean oil-derived plasticizers of the present invention are blended with PVC resins at concentrations of above 15%, preferably above 20% and most preferably above about 30% of the PVC matrix weight, these materials are effective primary plasticizers and thermal stabilizers. The upper limit of the plasticizers of the invention is about 150% of the PVC matrix weight. These materials, in combination with metal soaps, are highly effective as thermal stabilizers due to the high epoxide concentrations contributed by these materials. Typically the materials may be used without combination with the metal salts and are still effective thermal stabilizers.

The compositions of the plasticized polyvinyl chloride resins of the present invention may be formulated, in addition to the above described plasticizers, with various kinds of additives according to need. For example, additives which contribute to improvement of properties such as heat stability, lubricity, weathering resistance and the like, are exemplified by metal soaps such as calcium stearate, zinc stearate, lead stearate, barium stearate, cadmium stearate and the like, tribasic lead sulfate, dibasic lead phosphite, organotin compounds such as dibutyltin dilaurate, dibutyltin dimaleate, di-n-octyl-tin mercaptide, dimethyltin mercaptide and the like as a stabilizer, and esters such as butyl stearate, aliphatic acid amides such as ethylene bistearamide, higher fatty acids such as stearic acid and polyethylene waxes as a lubricant, fillers, anti-oxidants, ultraviolet absorbers, anti-static agents, anti-fogging agent, pigments, dye-stuffs, crosslinking aids and the like.

The term "polyvinyl chloride" (PVC) as used herein is intended to cover those homo- and copolymer resins of vinyl chloride known to persons of ordinary skill in the art. Generally speaking, copolymers of vinyl chloride (containing such monomers as vinyl acetate, propylene, ethylene, diethyl maleate, dimethyl fumarate, and other ethylenically unsaturated monomers) are intended to be covered. The term "polyvinyl chloride" as used herein is intended to cover those homo- and copolymer resins of vinyl chloride known to persons of ordinary skill in the art. Generally speaking, copolymers of vinyl chloride (containing up to about 20% of such monomers as vinyl acetate, propylene, ethylene, diethyl maleate, dimethyl fumarate, and other ethylenically unsaturated monomers) are intended to be covered.

Drying Oils

A drying oil is an oil which hardens to a tough, solid film after a period of exposure to air. Although called a drying oil, the oil does not harden through the evaporation of water or other solvents, but through a chemical reaction in which oxygen is absorbed from the environment (autoxidation). Drying oils are a key component of oil paint and many varnishes. Some commonly used drying oils include linseed oil, tung oil, poppy seed oil, perilla oil and walnut oil.

The "drying", hardening, or, more properly, curing of oils is the result of an exothermic reaction in the form of autoxidation. In this process, oxygen oxidizes the hydrocarbon chain, initiating a series of chemical reactions. As a result, the oil polymerizes, -cross-links, and bonds form between neighboring molecules, resulting in a polymer network. Conceptually, this network forms via a fusing of individual, randomly interlocking, strands into a cohesive mass or, in the case of varnishes and paints, into a solid film. Over time, this network may undergo further change. Certain functional groups in the networks become ionized, and the network transitions from a system held together by nonpolar covalent bonds to one governed by the ionic forces between these functional groups and the metal ions present in the pigment.

Vegetable oils consist of glycerol esters of fatty acids, which are long hydrocarbon chains with a terminal carboxyl group. In oil autoxidation, oxygen attacks a hydrocarbon chain, often at the site of an allylic hydrogen (a hydrogen on a carbon atom adjacent to a double bond). This produces a free radical, a substance with an unpaired electron which makes it highly reactive. A series of addition reactions ensue. Each step produces additional free radicals, which then engage in further polymerization. The process finally terminates when free radicals collide, combining their unpaired electrons to form a new bond. The polymerization stage occurs over a period of days to weeks, and renders the film dry to the touch.

Because the oil compositions of the invention are highly unsaturated, they can be used as drying oils. Typically, these oils are used in coating compositions (e.g., paint, varnish, etc.) at concentrations of up to 100 wt. %. In various formulations, the coating composition can include pigments and other additives at low concentrations. In those formulations, the concentration of the drying oil would be decreased accordingly.

In various embodiments, the drying oil is boiled, which is heating the oil with bubbling of oxygen to speed the drying process by pre-oxidizing the oil. Oxidation catalysts, typically metal naphthenates, can also be added in order to accelerate cure.

Under standard testing conditions, the oil compositions described above performed well even without boiling. In addition, by adding 0.08% cobalt (as cobalt naphthenate), unboiled 20% stearidonic acid soy oil compositions dry in a similar time as commercial boiled linseed oil promoted with cobalt and manganese.

These drying oils can be used as components of alkyd paints. Alkyd (polyester) paints are well known in the art, and are taught, for example, by Belder et al., in U.S. Pat. No. 4,299,742. These alkyd paints can contain, for example: (1) 45 wt. % to 85 wt. % of a drying oil component, or an unsaturated fatty acid component, such as the fatty acids found in the oil compositions described above, (2) 10 wt. % to 30 wt. % of a polyol such as propylene glycol, trimethylol propane, pentaerythritol, or the like, (3) 10 wt. % to 25 wt. % of a polycarboxylic acid, such as phthalic acid or anhydride, maleic acid or anhydride, or the like, (4) alkylene oxide, if a water-based paint is desired, and (5) suitable emulsifying agents and solvents.

Useful coatings, inks, sealants, or adhesives form when highly unsaturated drying oils participate in free-radical homopolymerizations or copolymerizations with other vinylic monomers. The polymerizations may be carried out in the absence of solvent (in bulk), in solution, or aqueous emulsion depending on the use intended. Thus, bulk polymerization would be preferred, for example, if a liquid composition containing the highly unsaturated drying oils described above was to be a solventless ink that is polymerized and cured in place. Still another application of bulk polymerization would be as reactive diluents in solventless coatings, sealant or adhesive formulations. Emulsion copolymers made with highly unsaturated drying oils are useful in a range of applications including paints, inks, sealants and adhesives. The presence of highly unsaturated drying oils in these systems imparts the ability to cure oxidatively under ambient conditions to provide solvent and water resistance as well as reduced critical film-forming temperatures.

Ink Compositions and Printed Articles

One aspect of the present invention is directed to an ink or coating composition containing oil compositions described herein. Inks suitable for various printing applications, including newspapers, can be formulated using the oil compositions described herein, but it is desirable to increase the viscosity of the oil. Various hydrocarbon resins can be added to increase the viscosity. Alternatively, the oil can be heat treated (or "bodied") to raise the viscosity by reacting the double bonds of the oil to oligomerize the unsaturated fatty acids.

Embodiments of the ink composition can contain an unbodied oil and include a resin to increase the viscosity, the ink composition contains from about 30 wt. % to about 65 wt. % of the oil composition based on the total weight of the ink composition. This ink composition may further contain from about 5 wt. % to about 30 wt. % of the pigment based on the total weight of the ink composition. Additionally, this ink composition may further contain from about 15 wt. % to about 30 wt. % of the hydrocarbon resin based on the total weight of the ink composition. In some instances, SDA soy oil is preferred in this type of ink formulation because it dries faster than typical commercial soy oil.

In addition to the components of the oil compositions described above, the ink compositions can also contain the typical components of conventional printing ink compositions such as pigments, dyes, surfactants, waxes, binders, thickeners, stabilizers, crosslinkers, and other additives known in the art. In particular, the compositions may contain a resin. The resin contributes to the printing ink's tack, film integrity, and cohesive properties. Typical printing ink resins are rosin derived resins, in particular, esters of rosin and modified rosin, synthetic rosin modified hydrocarbon resins, cyclized rubber, resins derived from Gilsonite, and combinations thereof. As understood by a skilled person, the choice of the particular resin to be utilized in the printing ink composition will be made on the basis of the desired properties of the finished product, for example, the printed material.

Resins for the printing ink vehicles of the present invention are those derived from rosin, in particular, esters of rosin, more particularly, esters of phenolic modified rosin, esters of rosin adducts and esters of dimerized rosin, most particularly esters of phenolic modified rosin. All of these resins are commercially available for example, esters of phenolic modified rosin are available under the trademarks PENTALYN 802A (Hercules Inc.), KRUMBHAAR K-2300 (Lawter International, Inc.) and SETALIN F-340 (Akzo Coatings Inc.). Esters of rosin adducts are available under the trademarks PENTALYN G, PENTALYN X and PENTREX 816 (all from Hercules Inc.) and KRUMBHAAR K-333 (Lawter International, Inc.), while an ester of dimerized rosin is available under the trademark PENTALYN K (Hercules Inc.).

The ink composition can also contain theological modifiers such as gelling agents to help lower the misting properties of a printing ink and to contribute to a faster setting printing ink as well as controlling the flow properties of the ink. Such gelling agents are typically organometallic compounds of aluminum or polyamide resins. Preferred gelling agents for the ink compositions are the organometallic compounds of aluminum, in particular, aluminum soaps, aluminum alkoxides or oxyaluminum acylates, most preferably, oxyaluminum acylates such as oxyaluminum octanoate. When utilizing a gelling agent in the ink composition, the composition is desirably manufactured under an inert atmosphere, the gelling agent is pre-diluted with the solvent and the pre-diluted gelling agent is slowly added to the other components of the ink composition.

When the ink composition contains a heat treated oil, the ink composition contains from about 70 wt. % to about 94 wt. % of the heat treated oil composition based on the total weight of the ink composition. This ink composition further contains from about 4 wt. % to about 30 wt. % of the pigment based on the total weight of the ink composition. The preparation and desired properties of inks formulated from heat-bodied oils are described by Erhan and Bagby in U.S. Pat. No. 5,122,188. An oil composition can be heat treated by heating at a temperature of from about 300° C. to about 335° C. As described in the Examples, use of an oil composition containing approximately 20 wt. % stearidonic acid enables heat bodying to be accomplished in less time and/or at lower temperatures than with conventional soy oil, resulting in a lighter-colored product. In the case of black ink, carbon black (such as Elftex carbon black from Cabot Corp.) can be used as the pigment and up to about 1 wt. % of a stabilizer (preferably, BHT (butylated hydroxytoluene)) can be added to the ink composition. According to Erhan and Bagby, the viscosity for a black offset news ink is from about 13 to about 24 poises and from about 5 to about 12 poise for a black letterpress ink. The viscosity of the printing ink vehicle should increase when the pigment concentration decreases to maintain acceptable ink tack and viscosity. Tack values for the offset ink are from about 3.5 to about 4.8 g-m and from about 2.6 to about 3.4 g-m for the letterpress ink. SDA soy oil, a highly unsaturated oil, is preferred in some instances in such an ink because it would increase in viscosity more rapidly (or at lower temperature) than conventional soy oil.

Stabilizers may be added to the ink compositions to retard auto-oxidation to prevent premature skinning of both the vehicle and the printing ink.

One or more drying catalysts can be added to aid in the oxidation drying of the ink composition. Such drying catalysts are preferably metal carboxylates or alkoxides with good solubility in oil, particularly cobalt and manganese metal compounds. Metal drying catalysts are commercially available. The preferred catalysts are mixtures of cobalt and manganese compounds dissolved in oil-compatible solvents, such as Octa Soligen 36, a solution of metal alkoxides in mineral oil containing 10% metal (3.75% Co+6.25% Mn) available from Borchers, Langenfeld, Germany.

The ink compositions described herein can be prepared in a conventional manner by mixing the components described herein to form a homogenous mixture. In particular, when an oil composition and pigment are the major components of the ink composition, the oil composition and pigment and mixed together and various optional additives (e.g., drying catalysts, gelling agents, and the like) are added to the mixture and mixed well. When the oil composition, resin, and pigment are the major components of the ink composition, the oil composition and the resin can be mixed and heated to the softening point of the resin. Once the resin and oil composition are fully mixed, the pigment can be added with stirring.

Ink compositions comprising SDA are suitable for use in a variety of printing methods such as lithography, offset lithography, gravure, offset gravure, letter press, flexographic, ink-jet, sheet-fed or intaglio printing. Preferably, the ink compositions described herein are used for offset lithography.

The printing methods using the ink compositions can further comprise a curing process as known in the art. This curing process can comprise heating the printed ink film. This curing or heating can also comprise radiation curing, for example, UV radiation, electron beam irradiation, and the like. Also, the ink composition can further comprise a photoinitiator. Photoinitiators are described by Leach and Pierce on pp. 643-650. Typical photoinitiators are derivatives of benzophenone, benzoin, or acetophenone.

The substrate used for the printing method or the printed article can be a cellulosic substrate. In other instances, the substrate can be a polymer film. When the substrate is a cellulosic substrate, it is can be made of paper, it can comprise recycled fibers, and it can be a woven or nonwoven substrate. In certain instances, the printed substrate is newsprint.

In some of the various printing methods and printed articles, the printing can comprise depositing a discontinuous film on the substrate. When there is a discontinuous film on the substrate, the film can create a halftone image. In other cases, the printing can further comprise applying multiple inks or coatings onto the substrate. These multiple inks or coatings can comprise multiple colors. The multiple inks or coatings could also comprise at least one pigmented ink and at least one overprint varnish. In certain instances, the printing method or printed article has an overprint varnish.

In various instances, the ink composition can be an EB cured ink, a hybrid ink, a UV cured ink, a heatset ink, or a coldset ink. Preferably, the ink composition is a newsprint ink. These types of ink compositions are described in U.S. Pat. Nos. 5,178,673; 6,200,372; 6,646,025; 5,552,467; and 6,730,153; U.S. Published Application Nos. 2006/0079607; 2007/0289488; 2007/0275258; and 2007/0263060; and WO06/042038. Heat set inks and formulations are discussed in The Printing Ink Manual, 5th ed., R. H. Leach and R. J. Pierce, eds., Springer, Dordrecht, the Netherlands, 2007, pp. 390-431.

The ink compositions can be used for producing paste printing inks which set, then dry, by oxidative action. When such inks are printed onto a porous substrate such as a cellulosic substrate (e.g., paper), setting occurs as the solvent penetrates the substrate by a wicking action, leaving the solids and in particular the resin and pigment on the surface of the substrate. The ink film then dries through oxidation of the oxidizable groups present in the components of the ink composition. Such oxidizable groups include unsaturated bonds such as carbon-carbon double bonds and carbon-oxygen double bonds (aldehydes and ketones) as well as carboxylic acid groups and hydroxyl groups.

Definitions

An oil composition is substantially epoxidized when at least 50%, 70%, 75%, 80%, 85%, 90%, 95% or more of the total number of double bonds of the fatty acids of the oil are epoxidized. Preferably, the oil is substantially epoxidized when at least 75% of the total number of the double bonds are epoxidized.

Having described the invention in detail, it will be apparent that modifications and variations are possible without departing from the scope of the invention defined in the appended claims.

EXAMPLES

The following non-limiting examples are provided to further illustrate the present invention.

Example 1

Epoxidation of Gamma Linolenic Acid (GLA)-Enriched Canola Oil

Epoxidation of a canola oil rich in gamma linolenic acid (GLA) catalyzed by formic acid and an ion exchange resin in acidic form was performed. The canola oil was extracted from the appropriate canola seed and processed using the conditions described above. Four similar reactions were conducted. Oxirane oxygen values were determined by titration with HBr in acetic acid, following AOCS Official Method Cd 9-57 (re-approved in 1997).

The fatty acid composition of the GLA canola oil was as follows.
C14:0=0.07%
C16:0=4.71%
C16:1=0.21%
C18:0=3.57
C18:1=29.7%
C18:2=25.41%
C18:3 n6=30.64%
C18:3 n3=1.3%
C20:0=1.1%
C20:1=0.9%
C22:0=0.5%

The following procedure describes run B, but all four runs were conducted in the same way except for minor variations in reaction times and catalyst levels. These variations and the oxirane oxygen concentration of the resulting oils are listed in the table. In two of the runs, the oxirane level was determined following the overnight run. In the first stage of the reaction, Dowex C-211 $H^+$ form, 16-50 mesh spherical beads (J. T. Baker, wet, as received) were rinsed with deionized water in a Buchner funnel and dried overnight at 80° C. under 24" Hg vacuum with nitrogen purge. 125.4 g of GLA canola oil, 5.0 g of 88% formic acid (Fisher Scientific), 74 g of 50% $H_2O_2$ (1.4 equiv.) and 12.0 g of dry resin beads were added to a 250 mL jacketed beaker equipped with a stir bar. Coolant (30° C.) was circulated while the mixture was stirred overnight under a nitrogen atmosphere. The temperature reached 32° C. in 25 minutes. After 15 hours with stirring the temperature was 31° C., the orange reaction mixture was filtered in a coarse fritted Buchner funnel and then added to a separatory funnel along with a solution of 30 g of NaCl in 200 ml of water. The flask was shaken, the aqueous layer drained, and the oil layer returned to the jacketed beaker, except for a small quantity that was centrifuged for oxirane oxygen analysis.

In the second stage of the reaction, the resin catalyst was returned to the jacketed beaker along with the epoxidized oil and 35° C. coolant was circulated. 50% $H_2O_2$ (37 g, 0.7 equiv.) and 88% formic acid (5.0 g) were added and the mixture was magnetically stirred under a nitrogen atmosphere. The temperature peaked at 38.5° C. after 25 minutes, fell to 37° C. after 1.5 hours, and 36° C. after four hours. After 6 hours with the temperature at 35.7° C., the viscosity appeared to be increasing and the color was fading. At this point, the reaction mixture was filtered into a filter flask containing a solution of 30 g of $Na_2HPO_4 \cdot 7H_2O$ in 200 ml of water. The aqueous layer was separated using a separatory funnel and the colorless oil phase was put on a centrifuge for 20 minutes at 4000 rpm.

| Run | Oil used (g) | Oil recovered (g) | Formic acid (g 1st stage/ g 2nd stage) | Resin (g) | Rxn times (hrs) | Oxirane Oxygen (overnight/final) |
|---|---|---|---|---|---|---|
| A | 122.1 | 100.6 | 5/5 | 12 | 17, 3.5 | —/7.45% |
| B | 125.4 | 98.7 | 5/5 | 12 | 15, 6 | —/7.71% |
| C | 128.7 | 103.9 | 6/5 | 15 | 14.5, 6.5 | 6.65%/7.80% |
| D* | 126.1 | 112.6 | 5/7 | 12 | 14.5, 4 | 6.20%/7.66% |

*Note: The amount of $Na_2HPO_4 \cdot 7H_2O$ was increased from 30 g to 40 g in 250 ml of water to neutralize increased formic acid in the second stage.

Example 2

Epoxidation of Enriched Stearidonic Acid (SDA) Soy Oil

The procedure of Example 1 was used to epoxidize SDA soy oil containing 11% SDA (stearidonic acid). The composition of the oil and the reaction conditions used, along with the oxirane oxygen values obtained are given in the following tables.

| Fatty acid composition (FAC, %) | |
|---|---|
| C14:0 (Myristic) | 0.10 |
| C16:0 (Palmitic) | 12.07 |
| C16:1 (trans-Hexadecanoic)** | 0.01 |
| C16:1n7 (Palmitoleic) | 0.11 |
| C17:0 (Margaric) | — |
| C18:0 (Stearic) | 4.19 |
| C18:1 (trans Octadecenoic) | 0.07 |
| C18:1n9 (Oleic) | 17.92 |
| C18:1 (Octadecenoic) | 1.46 |
| C18:2 (trans-Octadecadienoic) | 0.13 |
| C18:2n6 (Linoleic) | 35.21 |
| C18:3 (trans-Octadecatrienoic) | 0.40 |
| C18:3n6 (Gamma linolenic) | 4.91 |
| C18:3n3 (Alpha linolenic) | 10.13 |
| C18:4 (trans-Octadecatetraenoic) | 0.28 |
| C18:4n3 (Stearidonic) | 11.43 |
| C20:0 (Arachidic) | 0.41 |
| C20:1n9 (Eicosenoic) | 0.36 |
| C20:2n6 (Eicosadienoic) | 0.00 |
| C22:0 (Behenic) | 0.35 |
| C24:0 (Lignoceric) | 0.13 |
| Others | 0.35 |
| Total | 100.0 |
| Color (5.25″)** | 1.4Y 0.0R |
| Chlorophyll, ppm | 0.0 |
| Citric acid, ppm | <10 |
| Tocopherols (ppm) | |
| Alpha | 151 |
| Gamma | 683 |
| Delta | 102 |
| Total | 936 |

| Run | Oil used (g) | Oil recovered (g) | Formic acid (g 1st stage/ g 2nd stage) | Resin (g) | T (° C.) | Rxn times (hrs) | Oxirane Oxygen (overnight/final) |
|---|---|---|---|---|---|---|---|
| A | 127.2 | 108.0 | 6/5 | 12 | 30/35 | 17, 3.5 | 7.15%/7.92% |
| B | 131.7 | 95.6 | 5/5 | 10 | 30/35 | 16, 5.7 | 6.00%/7.95% |
| C | 126.1 | 115.0 | 6/5 | 12 | 30/30 | 24/3.0 | 7.81%/8.02% |
| D* | 125.9 | 107.4 | 6/5 | 12 | 30/30 | 21/4.0 | 7.47%/7.75% |
| E* | 129.0 | 129.5 | 6/5 | 12 | 30/30 | 25/4.2 | —/7.98% |

*Approximately 6 g of epoxidized oil was removed after the first stage of run D to determine oxirane oxygen level, but was later added to the second stage of run E.

Example 3

Epoxidation of a Genetically Modified Soy Oil Having 30% Stearidonic Acid (SDA)

The soy oil was epoxidized by the same procedure as in Example 1. The amount of 50% $H_2O_2$ used was increased slightly to 85 g in the first step and 40 g on the second step. Other conditions are given in the table below which also shows that an oxirane oxygen level of 9% was achieved, meeting the commercial specification for epoxidized linseed oil.

The composition of the oil was as follows.

| Fatty acid composition (FAC, %) | |
|---|---|
| C14:0 (Myristic) | 0.07 |
| C16:0 (Palmitic) | 12.4 |
| C16:1 (trans-Hexadecanoic) | 0.01 |
| C16:1n7 (Palmitoleic) | 0.12 |
| C17:0 (Margaric) | 0.13 |
| C18:0 (Stearic) | 4.14 |
| C18:1 (trans-Octadecenoic) | 0.07 |
| C18:1n9 (Oleic) | 14.6 |

-continued

| Fatty acid composition (FAC, %) | |
|---|---|
| C18:1 (Octadecenoic) | 1.34 |
| C18:2 (trans-Octadecadienoic) | 0.12 |
| C18:2n6 (Linoleic) | 18.5 |
| C18:3 (trans-Octadecatrienoic) | 0.3 |
| C18:3n6 (Gamma linolenic) | 7.29 |
| C18:3n3 (Alpha linolenic) | 10.5 |
| C18:4 (trans-Octadecatetraenoic) | 0.35 |
| C18:4n3 (Octadecatetraenoic) | 28.7 |
| C20:0 (Arachidic) | 0.37 |
| C20:1n9 (Eicosenoic) | 0.26 |
| C20:2n6 (Eicosadienoic) | 0.04 |
| C22:0 (Behenic) | 0.32 |
| C22:1 (Erucic) | — |
| C24:0 (Lignoceric) | 0.05 |
| Others | 0.37 |
| Total | 100.1 |

| Rxn | Oil used (g) | $H_2O_2$ (g) | Oil Recovered (g) | Formic acid (g 1st stage/ g 2nd stage) | Resin (g) | Temps (° C.) | Rxn times (hrs) | Oxirane Oxygen (overnite/final) | Color |
|---|---|---|---|---|---|---|---|---|---|
| A | 126.1 | 85/40 | 103.8 | 7/5 | 12 | 28-30/30 | 18, 2.5 | 8.85%/9.09% | Pale yellow |
| B | 115.9 | 80/40 | 106.0 | 6/5 | 10 | 25-27/30 | 22, 1.5 | 8.83%/9.23% | Light orange |
| C | 123.1 | 80/40 | 109.6 | 6/5 | 10 | 25/30 | 18, 2.9 | 8.05%/8.94% | Light orange |
| D | 119.6 | 80/40 | 108.3 | 6/5 | 10 | 25-27/30 | 17, 4 | 8.12%/9.14% | Light yellow |
| E | 116.3 | 80/40 | 100.2 | 7/5 | 10 | 25-27/30 | 18, 4.8 | —/9.01% | Light yellow |

Example 4

Polyvinyl Chloride Formulations

Polyvinyl chloride resin was mixed with epoxidized vegetable oil and other components of the formulation used for the preparation of plastic films. The table below gives the formulation as well as control formulations using di-isooctyl phthalate (DOP).

| Formulations with Epoxidized vegetable oils | | | |
|---|---|---|---|
| Function | Material used | Mass (g) | Loading (phr) |
| PVC Resin | GEON 471 resin | 200 | 100 |
| Plasticizer | None | | |
| Oxidative stabilizer | Ackrostab BZ-5043 | 6 | 3 |
| Thermal Stabilizer/Lubricant | Calcium stearate | 4 | 2 |
| Epoxidized SDA soy oil | Sample from Example 2 | 80, 120, 200 | 40, 60, 100 |

| Formulations with Di-octyl phthalate (DOP) | | | |
|---|---|---|---|
| Function | Material used | Mass (g) | Loading (phr) |
| PVC Resin | GEON 471 resin | 200 | 100 |
| Plasticizer | DOP | 80, 120, 200 | 40, 60, 100 |
| Oxidative stabilizer | Ackrostab BZ-5043 | 6 | 3 |
| Thermal Stabilizer/Lubricant | Calcium stearate | 4 | 2 |

Sources of the components of the formulation were as follows: PVC Resin: GEON 471, a general-purpose resin from PolyOne Corporation of Avon Lake, Ohio; dioctyl phthalate(bis(2-ethylhexyl)phthalate), Spectrum Chemical, Gardena, Calif., product D1049; calcium stearate: Spectrum Chemical, Gardena, Calif., product C1131 (described as a compound of calcium with a mixture of solid organic acids obtained from edible sources and consists chiefly of variable proportions of calcium stearate and calcium palmitate); and oxidative stabilizer: Akcrostab BZ-5043, Akzo Nobel, New Brunswick, N.J.

Films were prepared using 40, 60 and 100 phr loadings of epoxidized GLA canola and SDA soy oils prepared as described in the preceding examples. The oxirane oxygen value of the GLA canola master batch from Example 1 used for the formulations was 7.74%. The master batch of epoxidized SDA soy oil from Example 2 was determined to have 7.82% oxirane oxygen. The PVC resin was premixed with the calcium stearate. The liquid ingredients, epoxidized oils, Akcrostab BZ-5043, and dioctyl phthalate were combined in a separate bottle. The solids and liquids were held in a 84° C. oven and removed immediately before adding to the mixer.

Mixing was conducted in a Readco 1-quart sigma mixer equipped with a jacketed mixing chamber and a torquemeter. The jacket was heated by circulation of a 91° C. mixture of ethylene glycol and water. The torque and chamber temperature were recorded with a Yokogawa data acquisition module. Blending was conducted at a temperature of 80° C. inside the mixing chamber. The mixture of 200 g. of PVC resin and 4.0 g. of calcium stearate was added and stirred at 40 rpm for several minutes for temperature equilibration. The liquids were then added all at once and mixing continued for 10-14 minutes. Torque increased after liquid addition and then stabilized. The resin was seen to fluff up as the liquid was absorbed, where higher plasticizer levels led to increased fluff.

Example 5

Plastic Films

Blended powder (40 g) prepared in Example 4 was spread evenly over a 304 stainless steel picture frame mold with interior dimensions 5 inches square. The top square was placed on top and the mold was inserted into a Carver hydraulic press heated with a setpoint of 170° C. The mold sat on the press for about a minute until it was quite hot to the touch, before applying 45 klpbs pressure. Block temperatures fell at this point and then began to rise again. The average temperature during pressing was approximately 160° C. Several grams of powder were ejected from the press but the film always filled the mold.

Example 6

Mechanical Properties of Plastic Films

Mechanical properties of the films prepared in Example 5 are presented. A dogbone die was used to cut samples from clear, plasticized, portions of the films. The dogbones were 6.5 cm long and 1 cm wide throughout most of their length, narrowing to 0.121 inches (3.07 mm) in the middle. The exact dimensions of the narrow portion were measured with a micrometer. Mechanical properties of the plasticized films were determined using a Sintech 1/G tensile tester. Each film was tested in duplicate at ambient temperature. In addition to the di-octyl phthalate controls and the epoxidized GLA and SDA oils described in Examples 1 and 2, another oil derived from the same 11% SDA oil but with only 7.1% oxirane oxygen was formulated and tested in the same way. The tables below give the modulus and elongation at break for the plastics, which were tested in duplicate.

| 100 phr plasticizer | | |
|---|---|---|
| Plasticizer | Modulus (psi) | % strain at break |
| D-isooctyl phthalate | 946, 974 | 345, 162 |
| 7.1% oxirane oxygen epoxidized SDA soy oil | 1303, 1108 | 242, 275 |
| 7.8% oxirane oxygen epoxidized SDA soy oil | 1126, 1168 | 268, 290 |
| Epoxidized GLA canola oil 7.7% oxirane oxygen | 1229, 1244 | 224, 313 |

| 60 phr plasticizer | | |
|---|---|---|
| Plasticizer | Modulus (psi) | % strain at break |
| D-isooctyl phthalate | 2290, 2015 | 293, 235 |
| 7.1% oxirane oxygen epoxidized SDA soy oil | 3682, 3295 | 135, 196 |
| 7.8% oxirane oxygen epoxidized SDA soy oil | 5754, 5397 | 185, 189 |
| Epoxidized GLA canola oil 7.7% oxirane oxygen | 5976, 5415 | 139, 199 |

Example 7

SDA Soy Oil as a Drying Oil

ASTM Method D 1640-95 was used to compare 20% SDA soy with conventional soy and linseed oil. The method consisted of spreading a thin film of the oil onto a glass slide, which was left open to air at room temperature under room light. The experiment was performed in a hood lined with tissues, because the fluorescent lights in the hood were on continuously, unlike the room lights. The literature suggested the use of a cobalt naphthenate initiator (6% cobalt, as received), optionally enhanced by the addition of 1,10-phenanthroline, with a final cobalt concentration in the oil of about 0.1 wt. %. See W. H. Canty, G. K. Wheeler, and R. R. Myers, *Ind. Eng. Chem.*, 1960, 52, 67-70. The cobalt naphthenate was obtained from Alfa Aesar, stock no. 40387.

The following oils were tested: (1) Wesson vegetable oil, undoped; (2) Parks boiled linseed oil from a fresh bottle (label indicated the presence of cobalt and manganese neodecanoate and 2-ethylhexanoate); and (3) 20% SDA soy oil. The 20% SDA soy oil was extracted from seeds and processed under conditions described above and had the following fatty acid composition.

| C16 (Palmitic) | 12.7 |
|---|---|
| C18 (Stearic) | 3.755 |
| C18:1n9 (Oleic) + C181n7 | 16.685 |
| C18:2n6 (Linoleic) | 30.045 |

-continued

| C18:3n6 (gamma-Linolenic) | 5.535 |
|---|---|
| C18:3n3 (alpha-Linolenic) | 11.28 |
| C18:4n3 (Octadecatetraenoic) | 19.225 |

Several slides of the three oils were prepared. Eighteen hours later, the three linseed oil slides were dry. Three more slides of the linseed oil were prepared. The results for the second group of linseed oil samples were:

| Linseed oil with Co and Mn | | | |
|---|---|---|---|
| Time (hrs) | Film 1 | Film 2 | Film 3 |
| 2 | Not dry | Not dry | Not dry |
| 4 | Not dry | Not dry | Not dry |
| 6 | Not dry | Not dry | Not dry |
| 8 | Not dry | Dry | Not dry |
| 24 | Dry | Dry | Dry |

| Undoped SDA oil | | | | | |
|---|---|---|---|---|---|
| Time (days) | Film 1 | Film 2 | Film 3 | Film 4 | Film 5 |
| 1 | Not dry | Almost dry | Not dry | Not dry | Almost dry |
| 2 | Almost Dry | Almost dry | Almost dry | Almost dry | Almost dry |
| 3 | Some impression | No impression | Some impression | Slight impression | No impression |
| 5 | Dry | Dry | Slight impression | Dry | Dry |

None of the Wesson soy oil samples were dry after four days, although, surprisingly, one was almost dry after seven days. In addition, a 0.08 wt % Co SDA soy oil was prepared by diluting 0.0213 g of the Alfa Aesar cobalt naphthenate in mineral spirits to 1.6657 g. with the SDA soy oil, providing a 0.77% Co solution. The mixture was distinctly purple. Further dilutions with SDA soy oil afforded 0.04% and 0.02% solutions. Three slides of each mixture were prepared.

| Number of dry slides (out of 3) for SDA soy oil doped with cobalt naphthenate | | | |
|---|---|---|---|
| Time (days) | 0.02% Co | 0.04% Co | 0.08% Co |
| 1 | 1-Slightly Dry<br>2-Slightly Dry<br>3-Slightly Dry | 1-Almost Dry<br>2-Almost Dry<br>3-Almost Dry | 1-Dry<br>2-Dry<br>3-Dry |
| 2 | 1-Dry*<br>2-Dry*<br>3-Dry* | 1-Completely Dry<br>2-Completely Dry<br>3-Completely Dry | 1-Completely Dry<br>2-Completely Dry<br>3-Completely Dry |

*A bit softer than 0.04% and 0.08% Co SDA.

The 20% SDA soy oil, doped with cobalt, dried in a similar time as commercial linseed oil products, even without boiling. No color was observed, suggesting that SDA soy could be used to formulate a commercially viable drying oil.

Example 8

Heat Treated SDA Soy Oil and Commercial Soy Oil

A 500 mL 3-neck flask was equipped with stopcock adapters on the outer necks that were connected to house nitrogen and vacuum. Wesson soy oil (208 g) and a stirbar were added and the center neck was sealed with a septum pierced with a thermocouple. The flask was positioned on a heating mantle on top of a magnetic stirrer, insulated with glass wool, and heating was started (with stirring) and a setpoint of 330° C. Twice during the heating, the flask was evacuated and then filled with nitrogen. The vacuum line was then disconnected from the stopcock which was left open and a steady stream of nitrogen was passed through the headspace of the flask during the experiment.

The temperature oscillated between 300° C. and 340° C. even after it had "stabilized." Samples were removed periodically to test the viscosity. The color of the oil remained light and there was a steady stream of vapor exiting through the stopcock.

| Time (min) | Temp (° C.) | Notes |
|---|---|---|
| 0 | 25 | Heat on |
| 30 | 219 | |
| 39 | 300 | |
| 45 | 332 | Sample 1 |
| 90 | 220 | Alarm tripped |
| 105 | 320 | Sample 2 |
| 150 | 325 | Sample 3 |
| 210 | 321 | Sample 4 |
| 250 | 332 | Sample 5 |
| 280 | 225 | Sample 6, Stop |

A second experiment was conducted using the same protocol and 240 g of Wesson soy oil. The initial temperature was 41° C. because the controller did not work, but after a working controller was installed, the heating was continued. Beginning at two hours, (Sample 2) the color began to darken significantly. Sample 6 was dark brown.

| Time (min) | Temp (° C.) | Notes |
|---|---|---|
| 0 | 41 | New controller installed |
| 40 | 333 | Sample 1 |
| 90 | 334 | Sample 2 |
| 120 | 328 | Sample 3 |
| 180 | 330 | Sample 4 |
| 215 | 332 | Sample 5 |
| 250 | 333 | Sample 6, stop |

The experimental protocol described above was repeated with 250 g of 20 wt. % SDA soy oil using a setpoint of 300° C. The 20 wt. % SDA soy oil was a refined, bleached and deodorized oil. The color of the heat treated SDA soy oil was much lighter (a pale yellow) than the Wesson oil bodied at 330° C.

| Time (min) | Temp (° C.) | Notes |
|---|---|---|
| 0 | 27 | Heat on |
| 19 | 200 | |
| 35 | 301 | Sample 1 |
| 60 | 299 | Sample 2 |
| 90 | 301 | Sample 3 |
| 135 | 297 | Sample 4 |
| 180 | 300 | Sample 5 |
| 240 | 300 | Sample 6 |
| 285 | 295 | End of reaction, product collected |

Example 9

Viscosity of Heat Treated Oils

The viscosity of the second Wesson soy oil and the SDA soy oil from example 8 was measured on a Brookfield DV-II a digital viscometer. All viscosities were measured using spindle 18 at room temperature. The desired viscosity for a news ink vehicle is from about 500 to about 1250 cP (centipoises). The 20 wt. % SDA oil and the Wesson oil reach this viscosity range in about 3 to about 5 hours, but the 20 wt. % SDA oil reaches the desired viscosity at a lower temperature and has a lighter color than the Wesson oil.

| | Viscosity (in centipoises) of heat treated oil samples | | | |
|---|---|---|---|---|
| | Treated Wesson oil | | Treated SDA oil | |
| Sample No. | Treating time (min) | Viscosity (spindle speed) | Treating time (min) | Viscosity (spindle speed) |
| Untreated oil | — | 51 (30) | — | 41 (30) |
| 1 | 40 | 55 (30) | 35 | 44 (30) |
| 2 | 90 | 117 (12) | 60 | 78 (30) |
| 3 | 120 | 242 (6) | 90 | 141 (12) |
| 4 | 180 | 658 (3) | 135 | 265 (6) |
| 5 | 215 | 1120 (1.5) | 180 | 455 (6) |
| 6 | — | — | 240 | 825 (3) |
| Final product | 250 | 1640 (1.5) | 295 | 1220 (1.5) |

Example 10

Heat Treated 20 Wt. % SDA Soy Oil and Commercial Soy Oil

The protocol of example 8 was used to measure the color change of a 20 wt. % SDA soy oil and a commercial soy oil. The Wesson soy oil (250 g) was added to a clean, 500 mL three-neck flask. One neck was connected to a stopcock adapter which was connected to a vacuum line and the other to a source of nitrogen which could be shut off with a valve. The middle neck was sealed with a septum which was pierced with a ⅛" K-type thermocouple which was connected to the temperature controller. The flask was placed on a heating mantle on top of a magnetic stirrer and insulated with glass wool. Heat was applied with the temperature controller set to 330° C.

During heating, the flask was repeatedly evacuated and filled with nitrogen. The reaction was conducted under vacuum except when samples were withdrawn. For sampling, nitrogen flow was established and vacuum cut off for about a minute prior to sampling so as to develop positive pressure in the flask. The vacuum stopcock adapter was then briefly removed and a sample of the oil withdrawn using a glass Pasteur pipet. The stopcock adapter was then replaced and the flask was evacuated and filled with nitrogen. The reaction was continued under active nitrogen for a total of 245 minutes.

| Treatment of Wesson soy oil | | |
|---|---|---|
| Time (min) | Temp (° C.) | Notes |
| 10 | 100 | |
| 16 | 150 | |
| 30 | 250 | |
| 39 | 300 | |
| 49 | 336 | Sample 1 |
| 90 | 330 | Sample 2 |
| 138 | 328 | Sample 3 |
| 180 | 328 | Sample 4 |
| 210 | 335 | Sample 5 |
| 245 | 324 | Sample 6, stop |

A 20 wt. % SDA soy oil was then heat treated at 330° C. using the procedure as described in example 8.

Treatment of SDA soy oil at 330° C.

| Time (min) | Temp (° C.) | Notes |
|---|---|---|
| 0 | 26 | Heat on |
| 10 | 100 | |
| 20 | 200 | |
| 35 | 300 | |
| 40 | 329 | Sample 1 |
| 70 | 329 | Sample 2 |
| 100 | 333 | Sample 3 |
| 125 | 328 | Sample 4 |
| 150 | 333 | Sample 5 |
| 170 | | Stop, final product |

The 20 wt. % SDA heat treated oil was significantly lighter in color than the heat treated Wesson soy oil, confirming the advantage of SDA soy for bodied oil. However, the color was somewhat darker than the 20 wt. % SDA soy oil heat treated at 300° C. in example 8, but heat treatment to acceptable viscosity was faster.

The viscosities of the soy oils heat treated at 330° C. were measured with a Brookfield viscometer.

Viscosity of Wesson and SDA soy oil heat treated at 330° C.

| | Heat treated Wesson oil | | Heat treated SDA oil | |
|---|---|---|---|---|
| Sample No. | Treating time (min) | Viscosity (spindle speed) | Treating time (min) | Viscosity (spindle speed) |
| Untreated oil | — | 51 (30) | — | 41 (30) |
| 1 | 49 | 63 (12) | 40 | 64 (12) |
| 2 | 90 | 122 (12) | 70 | 440 (3) |
| 3 | 138 | 363 (6) | 100 | 1210 (0.3) |
| 4 | 180 | 845 (3) | 125 | 2860 (0.3) |
| 5 | 210 | 1330 (1.5) | 150 | 3770 (0.3) |
| Final product | 245 | 3390 (0.6) | 170 | 5680 (3-spindle 34) |

All viscosities measured at room temperature with spindle 18 except for the final SDA product, which used spindle 34.

Example 11

Newsink

News inks containing 12 wt. % blue pigment was prepared from the following formulation, using both SDA and conventional (Wesson) soy oil. The formulation procedure is described in Example 13.

29% Apollo Colors Phthalo Blue G Flush Color, 42% pigment (Apollo Colors Inc., Rockdale, Ill.)
26% LX-2600 Resin (Neville Chemical, Pittsburgh, Pa.)
45% SDA or conventional soy oil This formulation contained 12.2 wt. % pigment and had the following amounts of SDA soy oil and conventional soy oil.

| Soy oil used as diluent | % Conventional soy oil in ink | % SDA soy oil in ink |
|---|---|---|
| SDA Soy oil | 16.9% | 45.0% |
| Conventional soy oil | 61.8% | 0% |

It is expected that the drying properties of the SDA soy oil ink will be better than the drying properties of the commercial soy oil.

Example 12

Ink Formulations Containing Drying Catalysts

Oil drying can be enhanced by the addition of drying catalysts; these catalysts are typically cobalt and manganese carboxylates. Drying catalysts are used in heatset inks. The metal compounds can catalyze the cross-linking of double bonds in the ink vehicle. Heat set inks and formulations are discussed in The Printing Ink Manual, 5th ed., R. H. Leach and R. J. Pierce, eds., Springer, Dordrecht, the Netherlands, 2007, pp. 390-431.

SDA soy oil takes the place of the linseed alkyd and is expected to provide more desirable properties because it can be present in a higher concentration than in a typical linseed alkyd ink formulation. A resin (Neville LX-2600) is added to provide viscosity. Other components of the ink formulation are MPP-620 micronized polyethylene (available from Micro Powders Inc., Tarrytown, N.Y.), 30% cobalt 2-ethylhexanoate in mineral spirits (available as 6% Cobalt Hex Chem from OMG, Cleveland, Ohio), and 40% manganese 2-ethyl hexanoate in mineral spirits (available as 6% Manganese Hex Chem from OMG, Cleveland, Ohio). The resulting formulation prepared was as follows.

29.0% Soya Blue Flush Color
26.0% LX-2600 Resin
2.0% MPP-620 Micronized Polyethylene
0.6% 6% Cobalt Hex-Chem (0.03% Co)
0.9% 6% Manganese Hex-Chem (0.06% Mn)
41.5% SDA soy oil (20 wt. % SDA)

Example 13A

Commercial Soy Oil News Ink

Wesson soy oil (203.9 g) and 117.9 g of Neville LX-2600 resin were added to a 1 liter beaker. The beaker was wrapped with heating tape and glass wool insulation and the mixture agitated with an overhead stirrer while heat was applied. Temperature was monitored with a thermometer inserted in the liquid. The mixture was stirred, open to air with power applied to the heating tape for 45 minutes, bringing the temperature to 140° C. The temperature was chosen because it was the softening point of the resin. The heating was decreased and the temperature fell to 135° C. and stirring was continued for a further 75 minutes to ensure complete dissolution of the resin (it appeared to be fully dissolved at 45 minutes).

Apollo Colors Phthalo Blue G Flush Color, 42% pigment, Code BS-2734 (131.8 g) was weighed out and added in batches over 30 minutes with continuous stirring. The stir rate was then turned up and stirring continued for 80 minutes with the temperature at approximately 120° C. before the ink was transferred to a 1 quart jar.

The ink sat overnight and was then reheated in a 70° C. oven under 20 in. Hg (67.7 kPascal) vacuum with nitrogen purge and then transferred to a Waring industrial blender. After 15 minutes of blending, the ink was transferred to a new 1 quart jar and returned to the oven.

Example 13B 20 wt. % SDA Soy Oil News Enk

The same formulation was then prepared by substantially the same procedure as example 13A using 20 wt. % SDA soy oil. It was a refined, bleached, and deodorized SDA soy oil. This oil (203.9 g) and 117.9 g of Neville LX-2600 resin were added to a 1 liter beaker. The beaker was wrapped with heating tape and glass wool insulation and the mixture was agitated with an overhead stirrer while heating with the heating tape. The headspace was purged with nitrogen.

After 77 minutes at a temperature of 140° C., the resin had softened and fully blended with the soy oil. Apollo Colors Phthalo Blue G Flush Color, 42% pigment, Code BS-2734 (131.8 g) was weighed out and added in batches over 10 minutes while stirring continued. The stir rate was then increased to the highest level that could be achieved without splashing while continuing to heat and purge the headspace with nitrogen. After stirring for one hour, the ink was poured into the container of a Waring industrial blender which had been purged with nitrogen. The ink was blended for 15 minutes and then transferred to a 1 quart jar. The jar was placed in the antechamber of the drybox, gently evacuated, and then filled with argon. Due to ink burping, about 150 g of ink were recovered.

More ink was prepared according to this formulation on a smaller scale and with a different order of addition. Phthalo blue flush (66.8 g) was combined with 103.4 g of 20 wt. % SDA soy oil in a 1 liter beaker wrapped with heating tape and insulation. The mixture was stirred gently for 105 minutes under a nitrogen atmosphere. The heating brought the temperature to 120° C., but most of the flush color remained undispersed. Stirring was increased and the mixture was heated to 145° C. and the resin became soft. Neville LX-2600 resin (59.8 g) was added gradually over five minutes to prevent lumping of the resin on the agitator blade.

Stirring and heating were continued for another 20 minutes. The ink was then poured into the container of a Waring industrial blender that had been purged with nitrogen. The ink was blended for 15 minutes and then transferred to a 1 quart jar.

Example 13C 20 wt. % SDA Soy Oil Heat Set Ink

The heat set ink formulation was prepared similarly to the news inks described in examples 13A and 13B, but a cobalt and manganese drying catalyst was added at the end of the formulation process. The micronized polyethylene was added along with the resin in the early stages. The 20 wt. % SDA soy oil (188.0 g) used was the same as used in examples 13A and 13B, 9.07 g of MPP-620 micronized polyethylene, and 117.9 g of Neville LX-2600 resin were added to a 1 liter beaker. The mixture was stirred under nitrogen at a temperature of 140° C.

Apollo Colors Phthalo Blue G Flush Color, 42% pigment, Code BS-2734 (131.8 g) was added in batches over 6 minutes while stirring continued. The mixture was stirred at the maximum stir rate that did not allow splashing under nitrogen purge with continued heating for 75 minutes. Manganese Hex Chem (4.08 g) and 2.72 g of Cobalt Hex Chem were added and the mixture stirred for a further five minutes before transferring it to an industrial Waring blender. The blender container had been purged with nitrogen.

After blending for 20 minutes, the ink was transferred to a 1 quart jar. The headspace was purged with nitrogen and the jar capped. No attempt was made to degas this ink since it was blended under nitrogen and did not appear to have bubbles.

Example 14

UV-Curable Overprint Varnish

The UV-curable overprint varnish included an aluminum gelling agent to increase viscosity. A commercial oxoaluminum acylate based on octoic acid sold as a solution in isopropyl octoate ester by FedChem (Bethlehem, Pa.) under the name "Manalox® 730" was used to prepare the varnish. The aluminum content was 8.5 wt. %. Water and 2-ethylhexanoic acid were added to induce gelling.

The formulation also incorporated a prepolymer, trimethylol propane triacrylate (Alfa Aesar). A package of benzophenone and ethyl-4-dimethyl aminobenzoate was used as a photosensitizer.

| Ingredient | Amount |
|---|---|
| Manalox 730 | 6.0% |
| 2-ethylhexanoic acid | 5.6% |
| Water | 1.1% |
| 20 wt. % SDA or Conventional Soy Oil | 48.3% |
| Trimethylol propane triacrylate | 30.0% |
| Benzophenone | 6.0% |
| Ethyl-4-dimethyl aminobenzoate | 3.0% |

The formulation was prepared using 20 wt. % SDA soy oil on a 500 g scale. A control formulation was prepared using conventional (Wesson) soy oil. The procedure was as follows.

The concentration of Manalox 730 was chosen for scaleup to 500 g to provide the desired viscosity. The soy oil (SDA or conventional), acrylate, benzophenone, Manalox 730, and aminobenzoate were combined in a 500 mL roundbottom flask equipped with a stirbar and stirred in a 50° C. oil bath until the benzophenone was dissolved. The water and 2-ethylhexanoic acid was added to an unheated jar that was placed on a magnetic stirplate. The hot oil/acrylate mixture was added, the stirrer turned on, and the mixture stirred for one minute. The stir bar was removed immediately (with a magnet) and the mixture was allowed to sit and gel at room temperature without agitation.

The resulting gels were almost colorless and had a mild odor. The conventional soy oil-based formulation had a viscosity of 292 Poise.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above particles and processes without departing from the scope of the invention, it is intended that all matter contained in the above description and shown in the accompanying drawings shall be interpreted as illustrative and not in a limiting sense.

The invention claimed is:

1. An ink composition comprising a pigment and a heat treated oil composition, wherein the heat treated oil composition has a viscosity from about 500 centipoise to about 1250 centipoise and the oil composition prior to heat treatment comprises at least one polyunsaturated fatty acid having three or more carbon-carbon double bonds, and either:
    (a) at least 5.5 wt. % of at least one polyunsaturated fatty acid having four or more carbon-carbon double bonds and at least 16.5 wt. % of linoleic acid based upon the total weight of fatty acids in the oil composition;
    (b) at least 5.5 wt. % of at least one polyunsaturated fatty acid having four or more carbon-carbon double bonds, less than 14.5 wt. % of palmitic acid, and at least 3.5 wt. % linoleic acid based upon the total weight of fatty acids in the oil composition;
(c) at least 7.5 wt. % stearidonic acid based upon the total weight of fatty acids in the oil composition; or
(d) at least 20 wt. % gamma-linolenic acid based upon the total weight of fatty acids in the composition.

2. The ink composition of claim 1 comprising at least 10 wt. % of at least one polyunsaturated fatty acid having four or more carbon-carbon double bonds based upon the total weight of fatty acids in the oil composition.

3. The ink composition of claim 1 comprising at least 15 wt. % of at least one polyunsaturated fatty acid having four or more carbon-carbon double bonds based upon the total weight of fatty acids in the oil composition.

4. The ink composition of claim 2 wherein the polyunsaturated fatty acid having four or more carbon-carbon double bonds comprises stearidonic acid.

5. The ink composition of claim 4 comprising from about 70 wt. % to about 94 wt. % of the heat treated oil composition based on the total weight of the ink composition.

6. The ink composition of claim 5 comprising from about 4 wt. % to about 30 wt. % of the pigment based on the total weight of the ink composition.

7. An ink composition comprising a pigment, an oil composition, and a resin, wherein the oil composition comprises at least one polyunsaturated fatty acid having three or more carbon-carbon double bonds, and either:
(a) at least 5.5 wt. % of at least one polyunsaturated fatty acid having four or more carbon-carbon double bonds and at least 16.5 wt. % of linoleic acid based upon the total weight of fatty acids in the oil composition;
(b) at least 5.5 wt. % of at least one polyunsaturated fatty acid having four or more carbon-carbon double bonds, less than 14.5 wt. % of palmitic acid, and at least 3.5 wt. % linoleic acid based upon the total weight of fatty acids in the oil composition;
(c) at least 7.5 wt. % stearidonic acid based upon the total weight of fatty acids in the oil composition; or
(d) at least 20 wt. % gamma-linolenic acid based upon the total weight of fatty acids in the oil composition.

8. The ink composition of claim 7 comprising at least 10 wt. % of at least one polyunsaturated fatty acid having four or more carbon-carbon double bonds based upon the total weight of fatty acids in the oil composition.

9. The ink composition of claim 7 comprising at least 15 wt. % of at least one polyunsaturated fatty acid having four or more carbon-carbon double bonds based upon the total weight of fatty acids in the oil composition.

10. The ink composition of claim 8 wherein the polyunsaturated fatty acid having four or more carbon-carbon double bonds comprises stearidonic acid.

11. The ink composition of claim 10 comprising from about 30 wt. % to about 65 wt. % of the oil composition based on the total weight of the ink composition.

12. The ink composition of claim 11 comprising from about 5 wt. % to about 30 wt. % of the pigment based on the total weight of the ink composition.

13. The ink composition of claim 12 comprising from about 15 wt. % to about 30 wt. % of the resin based on the total weight of the ink composition.

14. A method of printing comprising printing a substrate with an ink composition of claim 1.

15. A method of printing comprising printing a substrate with an ink composition of claim 7.

16. A printed article made by the method of claim 14.

17. A printed article made by the method of claim 15.

18. An oil composition comprising at least one polyunsaturated fatty acid having three or more carbon-carbon double bonds, wherein at least 50% of the total number of double bonds of the unsaturated fatty acid or fatty acids in the composition are epoxidized, and wherein the composition comprises either:
(a) at least 5.5 wt. % of at least one polyunsaturated fatty acid having four or more carbon-carbon double bonds and at least 16.5 wt. % of linoleic acid based upon the total weight of fatty acids in the composition;
(b) at least 5.5 wt. % of at least one polyunsaturated fatty acid having four or more carbon-carbon double bonds, less than 14.5 wt. % of palmitic acid, and at least 3.5 wt. % linoleic acid based upon the total weight of fatty acids in the composition;
(c) at least 7.5 wt. % stearidonic acid based upon the total weight of fatty acids in the composition; or
(d) at least 20 wt. % gamma-linolenic acid based upon the total weight of fatty acids in the composition.

19. A paint composition comprising a pigment and a drying oil, wherein the drying oil composition comprises at least one polyunsaturated fatty acid having three or more carbon-carbon double bonds, and either:
(a) at least 5.5 wt. % of at least one polyunsaturated fatty acid having four or more carbon-carbon double bonds and at least 16.5 wt. % of linoleic acid based upon the total weight of fatty acids in the drying oil composition;
(b) at least 5.5 wt. % of at least one polyunsaturated fatty acid having four or more carbon-carbon double bonds, less than 14.5 wt. % of palmitic acid, and at least 3.5 wt. % linoleic acid based upon the total weight of fatty acids in the drying oil composition;
(c) at least 7.5 wt. % stearidonic acid based upon the total weight of fatty acids in the drying oil composition; or
(d) at least 20 wt. % gamma-linolenic acid based upon the total weight of fatty acids in the drying oil composition.

20. The ink composition of claim 1 wherein at least 5.5 wt. % of at least one polyunsaturated fatty acid having four or more carbon-carbon double and at least 16.5 wt. % of linoleic acid based upon the total weight of fatty acids in the oil composition.

21. The ink composition of claim 1 wherein at least 5.5 wt. % of at least one polyunsaturated fatty acid having four or more carbon-carbon double bonds, less than 14.5 wt. % of palmitic acid, and at least 3.5 wt. % linoleic acid based upon the total weight of fatty acids in the oil composition.

22. The ink composition of claim 1 wherein the oil composition prior to heat treatment comprises at least one polyunsaturated fatty acid having three or more carbon-carbon double bonds and at least 7.5 wt. % stearidonic acid based upon the total weight of fatty acids in the oil composition.

23. The ink composition of claim 22 comprising at least 10 wt. % of at least one polyunsaturated fatty acid having four or more carbon-carbon double bonds based upon the total weight of fatty acids in the oil composition.

24. The ink composition of claim 22 comprising at least 15 wt. % of at least one polyunsaturated fatty acid having four or more carbon-carbon double bonds based upon the total weight of fatty acids in the oil composition.

25. The ink composition of claim 1 wherein at least 20 wt. % gamma-linolenic acid based upon the total weight of fatty acids in the oil composition.

* * * * *